(12) United States Patent
Rebrovic et al.

(10) Patent No.: US 9,187,682 B2
(45) Date of Patent: Nov. 17, 2015

(54) REFRIGERATION COMPRESSOR LUBRICANT

(75) Inventors: Louis Rebrovic, New Bremen, OH (US); William Bradford Boggess, Lebanon, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 380 days.

(21) Appl. No.: 13/526,971

(22) Filed: Jun. 19, 2012

(65) Prior Publication Data

US 2012/0329689 A1    Dec. 27, 2012

Related U.S. Application Data

(60) Provisional application No. 61/500,867, filed on Jun. 24, 2011.

(51) Int. Cl.

| | |
|---|---|
| *C10M 105/38* | (2006.01) |
| *C10M 135/22* | (2006.01) |
| *C10M 135/28* | (2006.01) |
| *C09K 5/04* | (2006.01) |
| *C10M 171/00* | (2006.01) |
| *C10M 107/34* | (2006.01) |

(52) U.S. Cl.
CPC .............. *C09K 5/045* (2013.01); *C10M 105/38* (2013.01); *C10M 107/34* (2013.01); *C10M 171/008* (2013.01); *C10M 2207/2835* (2013.01); *C10M 2209/1095* (2013.01); *C10M 2219/08* (2013.01); *C10M 2219/083* (2013.01); *C10M 2219/086* (2013.01); *C10M 2219/104* (2013.01); *C10M 2219/106* (2013.01); *C10N 2220/302* (2013.01); *C10N 2220/303* (2013.01); *C10N 2230/02* (2013.01); *C10N 2230/06* (2013.01); *C10N 2240/30* (2013.01)

(58) Field of Classification Search
CPC   C09K 5/045; C10M 171/008; C10M 105/38; C10M 107/34; C10M 2207/2835; C10M 2209/1095; C10M 2219/08; C10M 2219/083; C10M 2219/086; C10M 2219/104; C10M 2219/106; C10N 2220/302; C10N 2220/303; C10N 2230/02; C10N 2240/30
USPC ..................... 508/273, 506; 252/68
See application file for complete search history.

(56) References Cited

U.S. PATENT DOCUMENTS

| | | | |
|---|---|---|---|
| 2,926,139 A | 2/1960 | Mott et al. | |
| 4,234,497 A | 11/1980 | Honig | |
| 4,243,540 A | 1/1981 | Mancini et al. | |
| 4,788,352 A | 11/1988 | Smutny | |
| 4,851,144 A | 7/1989 | McGraw et al. | |
| 4,959,169 A | 9/1990 | McGraw et al. | |
| 5,021,180 A | 6/1991 | McGraw | |
| 5,080,834 A | 1/1992 | Clumpner et al. | |

(Continued)

FOREIGN PATENT DOCUMENTS

| | | |
|---|---|---|
| CN | 1174880 A | 3/1998 |
| CN | 103717716 | 4/2014 |

(Continued)

OTHER PUBLICATIONS

International Search Report regarding Application No. PCT/US2012/043319, mailed Feb. 1, 2013.

(Continued)

*Primary Examiner* — James Goloboy
(74) *Attorney, Agent, or Firm* — Harness, Dickey & Pierce, P.L.C.

(57) ABSTRACT

The disclosed lubricant compositions comprise a mixture of from about 1-99% by weight of the mixture of one or more ester compounds

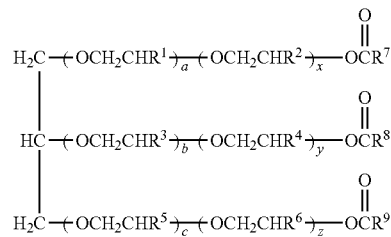

and from about 1-99% by weight of the mixture one or more second ester compounds

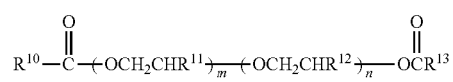

wherein $R^1$, $R^2$, $R^3$, $R^4$, $R^5$, $R^6$, $R^{11}$, and $R^{12}$ are each H or methyl; a+x, b+y. and c+z are integers of 1 to about 20, and m+n is an integer of 1 to about 10; and $R^7$, $R^8$, $R^9$, $R^{10}$ and $R^{13}$ are straight-chain and branched, substituted or unsubstituted alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, or cycloalkylarylalkyl groups having 1 to about 17 carbons. The lubricant composition may be combined with a refrigerant to form a refrigerant-lubricant composition that may be used as a working fluid in a heat transfer apparatus.

18 Claims, 5 Drawing Sheets

(56) References Cited

U.S. PATENT DOCUMENTS

| | | | |
|---|---|---|---|
| 5,137,650 A | 8/1992 | Kaneko | |
| 5,152,926 A | 10/1992 | Brown | |
| 5,185,092 A | 2/1993 | Fukuda et al. | |
| 5,194,621 A | 3/1993 | Karol et al. | |
| 5,366,648 A | 11/1994 | Salomon et al. | |
| 5,395,544 A | 3/1995 | Hagihara et al. | |
| 5,512,190 A | 4/1996 | Anderson et al. | |
| 5,620,950 A | 4/1997 | Kamakura et al. | |
| 5,716,916 A | 2/1998 | Shiokawa et al. | |
| 5,750,750 A | 5/1998 | Duncan et al. | |
| 5,801,132 A | 9/1998 | Kaneko et al. | |
| 5,830,833 A | 11/1998 | Grasshoff et al. | |
| 5,858,266 A | 1/1999 | Kaneko | |
| 5,866,030 A * | 2/1999 | Reyes-Gavilan et al. | 252/68 |
| 5,895,778 A | 4/1999 | McHenry et al. | |
| 5,911,514 A | 6/1999 | Davies et al. | |
| 6,074,573 A | 6/2000 | Kaneko | |
| 6,183,661 B1 | 2/2001 | Makin et al. | |
| 6,245,254 B1 | 6/2001 | Corr | |
| 6,290,869 B1 | 9/2001 | Sorensen et al. | |
| 6,410,492 B1 | 6/2002 | Shimomura et al. | |
| 6,425,977 B2 | 7/2002 | McDonald et al. | |
| 6,436,881 B1 | 8/2002 | McHenry et al. | |
| 6,444,626 B1 | 9/2002 | McHenry et al. | |
| 6,461,679 B1 | 10/2002 | McMeekin et al. | |
| 6,849,583 B2 | 2/2005 | Corr et al. | |
| 6,971,244 B2 | 12/2005 | Domyo | |
| 7,294,607 B2 | 11/2007 | Godici et al. | |
| 7,763,574 B2 | 7/2010 | Donnelly et al. | |
| 7,811,071 B2 | 10/2010 | Fontaine et al. | |
| 8,444,874 B2 | 5/2013 | Singh et al. | |
| 8,703,660 B2 | 4/2014 | Schmitt et al. | |
| 9,005,469 B2 | 4/2015 | Ishida | |
| 9,027,249 B2 | 5/2015 | Schmitt et al. | |
| 2002/0013233 A1 | 1/2002 | Corr et al. | |
| 2002/0077255 A1* | 6/2002 | Kawaguchi et al. | 508/579 |
| 2003/0201420 A1 | 10/2003 | Schlosberg et al. | |
| 2007/0069175 A1 | 3/2007 | Thomas et al. | |
| 2007/0213239 A1 | 9/2007 | Kaneko | |
| 2007/0257229 A1 | 11/2007 | Tagawa et al. | |
| 2008/0099190 A1 | 5/2008 | Singh et al. | |
| 2008/0237534 A1 | 10/2008 | Kajiki et al. | |
| 2009/0156441 A1 | 6/2009 | Rowland et al. | |
| 2009/0156449 A1 | 6/2009 | Rowland et al. | |
| 2009/0181872 A1* | 7/2009 | Yamada | 508/591 |
| 2010/0012882 A1 | 1/2010 | Sherman et al. | |
| 2010/0093568 A1 | 4/2010 | Tagawa et al. | |
| 2010/0117022 A1 | 5/2010 | Carr et al. | |
| 2010/0175421 A1 | 7/2010 | Kaneko et al. | |
| 2010/0176333 A1 | 7/2010 | Tokiai et al. | |
| 2010/0181523 A1 | 7/2010 | Kelley et al. | |
| 2010/0205980 A1 | 8/2010 | Dixon et al. | |
| 2010/0210487 A1 | 8/2010 | Deblase et al. | |
| 2010/0282999 A1 | 11/2010 | Shimomura et al. | |
| 2010/0292114 A1 | 11/2010 | Huang et al. | |
| 2011/0023531 A1 | 2/2011 | Kaneko et al. | |
| 2011/0039739 A1 | 2/2011 | Greaves et al. | |
| 2011/0052439 A1 | 3/2011 | Watanabe | |
| 2011/0079749 A1 | 4/2011 | Carr et al. | |
| 2011/0240910 A1 | 10/2011 | Carr et al. | |
| 2013/0200295 A1 | 8/2013 | Rebrovic et al. | |
| 2014/0023540 A1 | 1/2014 | Heidecker et al. | |
| 2014/0024563 A1 | 1/2014 | Heidecker et al. | |
| 2015/0147012 A1 | 5/2015 | Scancarello | |

FOREIGN PATENT DOCUMENTS

| | | |
|---|---|---|
| DE | 29914502 U1 | 11/1999 |
| EP | 0377122 A1 | 7/1990 |
| EP | 0634467 A2 | 1/1995 |
| EP | 0377122 B1 | 6/1995 |
| EP | 0982393 A1 | 3/2000 |
| EP | 0634467 B1 | 10/2000 |
| EP | 0422185 B2 | 8/2008 |
| EP | 2551334 A1 | 1/2013 |
| RU | 2238964 C2 | 10/2004 |
| WO | 9005172 A1 | 5/1990 |
| WO | WO-9012849 A1 | 11/1990 |
| WO | 9823444 A1 | 6/1998 |
| WO | 2015081258 A1 | 6/2005 |
| WO | WO-2012177742 A2 | 12/2012 |

OTHER PUBLICATIONS

Written Opinion of the International Search Authority regarding Application No. PCT/US2012/043319, mailed Feb. 1, 2013.

Cuvan® 826, Material Safety Data Sheet, Vanderbilt Chemicals, LLC (Dec. 21, 2012).

Cuvan® 826 Specification, Vanderbilt Chemicals, LLC (Oct. 5, 2007).

Icematic SW 32 Safety Data Sheet, Castrol, Version 1.01 (Jun. 1, 2004).

Karol, Thomas J., et al., "New Grease Technology: Extreme Pressure Additive," News & Articles, R.T. Vanderbilt Company, Inc., http://www.rtvanderbilt.com/OD972k_a.htm (downloaded on Feb. 26, 2013).

Lubricant Additives Brochure, Vanderbilt Chemicals, LLC (Jan. 31, 2013).

Pate, Michael, B., et al., "Miscibility of Lubricants With Refrigerants Final Report," Iowa State University of Science and Technology, Department of Mechanical Engineering, prepared for the Air-Conditioning and Refrigeration Technology Institute, pp. 2, 10-12, 19, 82, and 255 (Jul. 1993).

Benanti, T.L. et al. (2014). Effects of Refrigerant-Lubricant Combinations on the Energy Efficiency of a Convertible Split-System Residential Air-Conditioner. International Refrigeration and Air Conditioning Conference on Jul. 14-17, 2014 at Purdue University.

Hessell, Edward T. et al. (2014). Lubricants Optimized for use with R-32 and Related Low GWP Refrigerant Blends. Conference on Jul. 14-17, 2014 at Purdue University.

Okido, T. et al. (2012). Development of Refrigeration Oil for Use With R32. International Refrigeration and Air Conditioning Conference on Jul. 16-19, 2012 at Purdue University.

Office Action regarding Chinese Patent Application No. 201280036934.X, dated Aug. 28, 2015. Summary translation provided by Unitalen Attorneys at Law.

American Society of Heating, Refrigerating and Air-Conditioning Engineers, Inc., 2010 ASHRAE Handbook—Refrigeration, SI Edition, p. 6.6 (2010).

ASTM International Designation D445-03, Standard Test Method for Kinematic Viscosity of Transparent and Opaque Liquids (and the Calculation of Dynamic Viscosity), pp. 193-199 (Rev. Mar. 10, 2003) (Apr. 2003).

ASTM International Designation D2270-93 (Reapproved 1998), Standard Practice for Calculating Viscosity Index From Kinematic Viscosity at 40 and 100°C, pp. 1-7 (Rev. Mar. 15, 1993) (May 1993).

ASTM International Designation D2670-95 (Reapproved 1999), Standard Test Method for Measuring Wear Properties of Fluid Lubricants (Falex Pin and Vee Block Method), pp. 1-8 (Rev. Dec. 10, 1995) (Feb. 1996).

ASTM International Designation D4928-00e1, Standard Test Methods for Water in Crude Oils by Coulometric Karl Fischer Titration, pp. 951-955 (Rev. Sep. 10, 2000) (Oct. 2000).

Benanti, Travis L., et al., "Effects of Refrigerant-Lubricant Combinations on the Energy Efficiency of a Convertible Split-System Residential Air Conditioner," 15th International Refrigeration and Air Conditioning Conference, Purdue University, Jul. 14-17, 2014, Paper 1509, Purdue e-Pubs, vol. 2499, pp. 1-8 (2014) (available at http://docs.lib.purdue.edu/iracc/1509).

Brown, M., et al., "Chapter 2: Synthetic Base Fluids," Chemistry and Technology of Lubricants, Third Ed., Roy M. Mortier et al., eds., pp. 56-57 (2010).

Hessell, Edward T., et al., "Lubricants Optimized for use with R-32 and Related Low GWP Refrigerant Blends," 15th International Refrigeration and Air Conditioning Conference, Purdue University, Jul. 14-17, 2014, Paper 1477, Purdue e-Pubs, vol. 2413, pp. 1-8 (2014) (available at http://docs.lib.purdue.edu/iracc/1477).

(56) References Cited

OTHER PUBLICATIONS

Kohashi, Hitoshi, "Application of Fatty Acid Esters for Lubricating Oil," Proceedings of World Conference on Oleochemicals into the 21st Century, edited by Thomas H. Applewhite, American Oil Chemists' Society, Champaign, pp. 243-250 (1991).

Okido, Takeshi, et al., "Development of Refrigeration Oil for Use With R32," International Refrigeration and Air Conditioning Conference, Purdue University, Jul. 16-19, 2012, Paper 1216, Purdue e-Pubs, vol. 2221, pp. 1-7 (2012) (available at http://docs.lib.purdue.edu/iracc/1216).

Stepina, Vaclav, et al., Lubricants and Special Fluids, Tribology series, 23, p. 32 (1992).

International Preliminary Report on Patentability issued on Dec. 24, 2013 for PCT International Application No. PCT/US2012/043319 (Pub. No. WO 2012/177742).

First Office Action dated Oct. 17, 2014 issued by the Chinese State Intellectual Property Office in Chinese Patent Application No. 201280036934.X (Pub. No. CN 103717716), English language summary provided by Unitalen Attorneys at Law.

First Office Action dated Nov. 21, 2014 issued by the Russian Patent Office in related Russian Patent Application No. 2013157760, translation provided by Gowlings International Inc.

Extended European Search Report dated Feb. 25, 2015 issued by the European Patent Office in related European Application No. 12802435.3—1352/2723834 PCT/US2012043319.

International Search Report mailed Mar. 11, 2015 for PCT International Application No. PCT/US2014/067710 (Pub. No. WO 2015/081258).

Written Opinion of the International Searching Authority mailed Mar. 11, 2015 for PCT Application No. PCT/US2014/067710 (Pub. No. WO 2015/081258).

Second Office Action dated Mar. 27, 2015 issued by the Russian Patent Office in related Russian Application No. 2013157760. Translation provided by Gowlings International Inc.

\* cited by examiner

REFRIGERATION COMPRESSOR LUBRICANT

CROSS-REFERENCE TO RELATED APPLICATION

This application claims the benefit of U.S. Provisional Patent Application No. 61/500,867, filed Jun. 24, 2011, which is hereby incorporated herein by reference in its entirety.

FIELD

This inventive technology is in the field of lubricants, particularly lubricants used in heat-transfer equipment, such as refrigeration compressors; compressors and refrigeration systems including such lubricants; and refrigeration methods using such lubricants.

BACKGROUND OF THE DISCLOSURE

The statements in this section provide background information related to this disclosure and may not constitute prior art.

Heat transfer devices that operate using a vapor-compression refrigeration cycle, including heat pumps, air conditioners (including auto, home, and industrial air conditioners), and refrigerators (including home and industrial refrigerators and freezers), employ refrigerants and lubricants during operation. In a typical heat transfer system, a liquid of suitable boiling point evaporates at low pressure, absorbing heat in doing so. The vapor produced is then compressed and passed to a condenser where it is condensed, generating heat. The liquid condensate is returned through an expansion valve to the evaporator, completing a refrigeration cycle. One important type of refrigeration system is known as "small refrigeration" or "domestic refrigeration" systems, which encompasses systems that are typically used in residential homes, apartments and the like for consumer use in refrigerators, freezers, and the like. Also frequently included in this group are vending machines and the like. Another important refrigeration system comprises automotive air conditioning systems used to provide cooling in motor vehicles.

Refrigerants are often combined with compatible lubricants to form the refrigeration liquids used in the refrigeration compressors. The lubricants ensure that moving parts of the heat transfer devices are lubricated to facilitate operation and avoid wear. Government regulations have affected which fluids may be used as refrigerants in these devices. This in turn has necessitated finding new lubricants that will work well with the new refrigerants. Devices are generally designed to use lubricants that are miscible with the refrigerant during operation. To perform as a satisfactory refrigeration liquid, the mixture of refrigerant and lubricant must be compatible and miscible over a wide temperature range.

SUMMARY

This section provides a general summary of the disclosure and is not intended as a comprehensive disclosure of the full scope of the disclosure or all of its features.

This disclosure describes lubricants of particular composition, refrigerant/lubricant combinations, heat transfer systems, such as heat transfer devices including stationary and mobile refrigeration and air conditioning applications including these combinations, and methods for these. In certain aspects, the refrigerant and lubricant combinations are substantially soluble in each other (e.g., miscible) during operation of the refrigeration and air conditioning equipment to facilitate adequate lubricant circulation from the compressor, through the condenser, expansion device, and evaporator, and back to the compressor. Insufficient lubricant circulation can potentially affect compressor reliability. Low temperature solubility is particularly important to ensure lubricant flow through a cold evaporator. The disclosed lubricants provide unexpectedly broad temperature ranges of miscibility and unexpectedly low minimum miscibility temperatures with various refrigerants, including a number of refrigerants for which lubricant compositions with adequate miscibility temperature ranges were previously unknown, such as R410a, R32, and HFO refrigerants like HFO-1234yf (2,3,3,3-tetrafluoroprop-1-ene) and HFO-1234ze (trans-1,3,3,3-tetrafluoroprop-1-ene).

In certain aspects, the disclosed lubricant compositions comprise (a) one or more first ester compounds having a representative structure

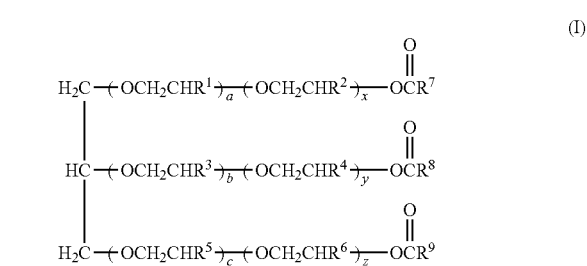

wherein each of $R^1$, $R^2$, $R^3$, $R^4$, $R^5$, and $R^6$ is independently H or methyl; each of a, b, c, x, y, and z is independently an integer and a+x, b+y, and c+z are each independently an integer of 1 to about 20; and $R^7$, $R^8$, and $R^9$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms that may be substituted or unsubstituted; and (b) one or more second ester compounds having a representative structure

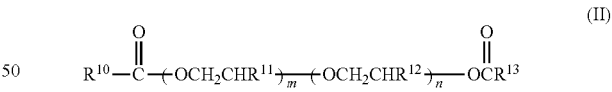

wherein each of $R^{11}$ and $R^{12}$ is independently H or methyl; each of m and n is independently an integer and m+n is an integer of 1 to about 10; and $R^{10}$ and $R^{13}$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, aryl alkylcycloalkyl, cycloalkylalkylaryl, and cycloalkylarylalkyl groups having 1 to about 17 carbon atoms that may be substituted or unsubstituted. Also disclosed are embodiments in which the first ester compound or compounds (a) and the second ester compound or compounds (b) together form at least about 50% by weight of the lubricant composition. Further disclosed are embodiments in which the first ester compound or compounds (a) and the second ester compound or compounds (b) are in a weight ratio of about 1:99 to about 99:1, or about 1 to about 99% by weight of the one or more first ester compounds (a) to about 1 to about 99% by weight of the one or more second ester compounds (b), based on a combined weight of the first ester compound or compounds (a) and the second ester compound or compounds (b) being 100%. All ranges include the endpoints.

In certain aspects, the disclosed lubricant compositions comprise one or more first ester compounds having a representative structure

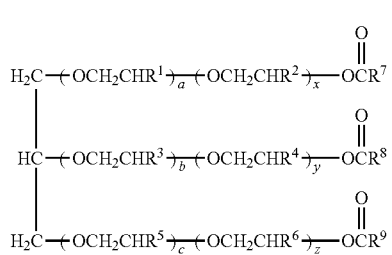
(I)

wherein each of $R^1$, $R^2$, $R^3$, $R^4$, $R^5$, and $R^6$ is independently H or methyl; each of a, b, c, x, y, and z is independently an integer and a+x, b+y, and c+z are each independently an integer of 1 to about 20; and $R^7$, $R^8$, and $R^9$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms that may be substituted or unsubstituted; and one or more second ester compounds having a representative structure

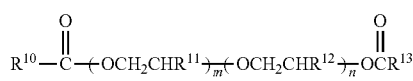
(II)

wherein each of $R^{11}$ and $R^{12}$ is independently H or methyl; each of m and n is independently an integer and m+n is an integer of 1 to about 10; and $R^{10}$ and $R^{13}$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms that may be substituted or unsubstituted, wherein the first ester compound or compounds of structure (I) and the second ester compound or compounds of structure (II) are in a weight ratio of about 1:99 to about 99:1 and together form at least about 50 weight percent of the lubricant composition.

The lubricant compostions may include other, optional materials, including additives, such as antioxidants, anti-wear additives, and extreme pressure agents in amounts that may be, for example, about 0.1 to about 5% by weight in the lubricant composition, and the lubricant compositions may contain minor amounts of other lubricants, for example polyol esters and polyalkylene glycols, with the proviso that the total weight percent in the lubricant composition of all other lubricants together is less than the weight percent in the lubricant composition of the mixture consisting of the first ester compound or compounds (a) and the second ester compound or compounds (b).

The lubricant composition may be combined with a refrigerant to form a lubricant and refrigerant combination that may be used as a "working fluid" for a heat transfer device. The lubricant and refrigerant combinations include a minor weight percent (less than 50% by weight) of the lubricant composition and a major weight percent (more than 50% by weight) of one or more refrigerant compounds. In various embodiments, the lubricant and refrigerant combinations may be used as working fluids in refrigeration systems, including in automotive air conditioners, domestic or industrial refrigerators, freezers, and air conditioners, heat pumps, vending machines, showcases, and water supplying systems. Also disclosed are stationary and mobile refrigeration and air conditioning equipment including such automotive air conditioners, domestic or industrial refrigerators, freezers, and air conditioners, heat pumps, vending machines, showcases, and water supplying systems containing the disclosed refrigerant/lubricant combinations and methods of operating such equipment including the disclosed refrigerant/lubricant combinations.

In certain aspects, the disclosed lubricant compositions have excellent miscibility with many refrigerants, including R410a, R32, and HFO refrigerants (or with combinations of these refrigerants), even at very low temperatures, while providing excellent viscosity indices and lubricities.

"A," "an," "the," "at least one," and "one or more" are used interchangeably to indicate that at least one of the item is present; a plurality of such items may be present. The terms "comprises," "comprising," "including," and "having," are inclusive and therefore specify the presence of stated features, integers, steps, operations, elements, and/or components, but do not preclude the presence or addition of one or more other features, steps, elements, components, and/or groups thereof. It is also to be understood that additional or alternative method steps may be employed. Throughout this disclosure, the numerical values represent approximate measures or limits to ranges to encompass minor deviations from the given values and embodiments having about the value mentioned as well as those having exactly the value mentioned. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges. All ranges include the endpoints given.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure or claimed invention.

FIG. 4 is a graph of miscibility of certain lubricants compositions as disclosed in R410a;

DETAILED DESCRIPTION OF THE PREFERRED EMBODIMENTS

Figure 1:
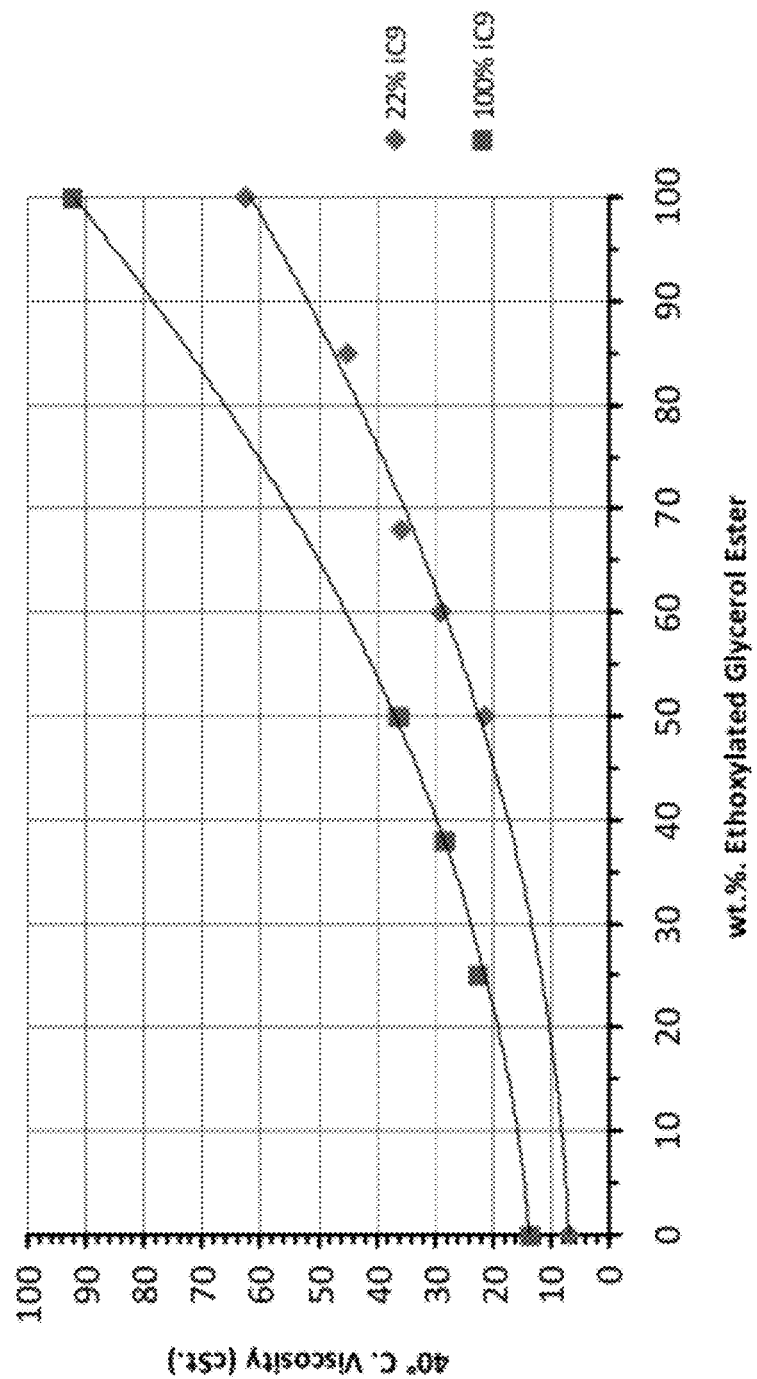
FIG. 1 is a graph of kinematic viscosities of certain lubricant compositions as disclosed measured according to ASTM D445.

The details, examples and preferences provided above in relation to any particular one or more of the stated aspects of the present invention, and described and exemplified below in relation to any particular one or more of the stated aspects of the present invention, apply equally to all aspects of the present invention.

The disclosed lubricant compositions comprise a mixture of one or more first ester compounds (a) and one or more second ester compounds (b). In certain variations, such a mixture comprises about 1 to about 99% by weight of one or more first ester compounds (a) and about 1 to about 99% by weight of one or more second ester compounds (b). In certain aspects, the first ester compound or compounds (a) and the second ester compound or compounds (b) together form at least about 50% by weight of the lubricant composition. In certain other variations, such a mixture comprises about 20 to about 80% by weight of one or more first ester compounds (a) and about 20 to about 80% by weight of one or more second ester compounds (b). In yet other variations, such a mixture optionally consists essentially of about 1 to about 99% by weight of one or more first ester compounds (a) and about 1 to about 99% by weight of one or more second ester compounds (b). In certain variations, a lubricant composition comprises a mixture consisting of about 1 to about 99% by weight of one or more first ester compounds (a) and about 1 to about 99% by weight of one or more second ester compounds (b).

The one or more first ester compounds (a) has or have a representative structure (I)

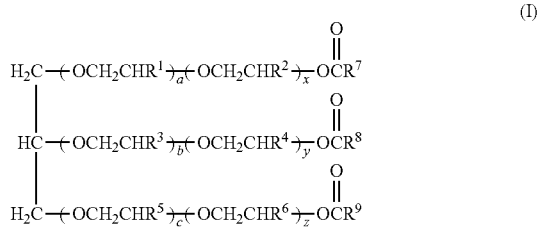

in which each of $R^1$, $R^2$, $R^3$, $R^4$, $R^5$, and $R^6$ is independently hydrogen (H) or methyl ($CH_3$); each of a, b, c, x, y, and z is independently an integer and a+x, b+y, and c+z are each independently an integer from 1 to about 20; and $R^7$, $R^8$, and $R^9$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylaryl alkyl groups having 1 to about 17 carbon atoms and that may be substituted or unsubstituted.

In various embodiments, each of $R^7$, $R^8$, and $R^9$ may independently be straight-chain or branched-chain alkyl or alkenyl groups or substituted or unsubstituted cycloalkyl groups, each of which may contain heteroatoms such as O, F, N, S, or Si or may be hydrocarbyl groups. In various embodiments, each of $R^7$, $R^8$, and $R^9$ independently has about 3 to about 8 carbon atoms or $R^7$, $R^8$, and $R^9$ together have an average of about 5 to about 7 carbon atoms on a weight basis or both each of $R^7$, $R^8$, and $R^9$ independently has about 3 to about 8 carbon atoms and $R^7$, $R^8$, and $R^9$ together have an average of about 5 to about 7 carbon atoms on a weight basis.

In various embodiments, a+x, b+y, and c+z are each independently an integer from 1 to about 10, or a+x, b+y, and c+z are each independently an integer from 2 to about 8, or a+x, b+y, and c+z are each independently an integer from 2 to 4.

In certain embodiments, each of $R^1$, $R^2$, $R^3$, $R^4$, $R^5$, and $R^6$ is hydrogen (H), so that the first ester compound (a) or at least one of the more than one first ester compounds (a) if the lubricant composition includes more than one first ester compounds (a) has or have a representative structure (III)

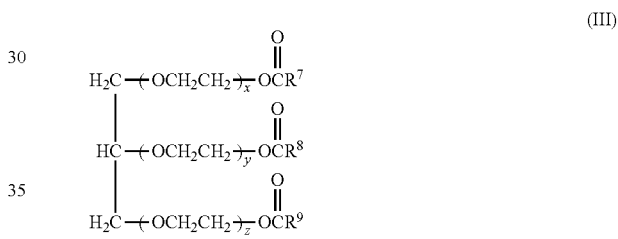

wherein x, y, and z are each independently an integer of 1 to about 20, or of 1 to about 10, or of 2 to about 8 or of 2 to about 4, and $R^7$, $R^8$, and $R^9$ are as previously defined.

In various embodiments, each of $R^7$, $R^8$, and $R^9$ in structure (III) may be straight-chain or branched-chain alkyl or alkenyl groups or substituted or unsubstituted cycloalkyl groups, each of which may contain heteroatoms such as O, F, N, S, or Si or may be hydrocarbyl groups. In various embodiments, each of $R^7$, $R^8$, and $R^9$ in structure (III) independently has about 3 to about 8 carbon atoms or $R^7$, $R^8$, and $R^9$ together have an average of about 5 to about 7 carbon atoms on a weight basis or both each of $R^7$, $R^8$, and $R^9$ independently has about 3 to about 8 carbon atoms and $R^7$, $R^8$, and $R^9$ together have an average of about 5 to about 7 carbon atoms on a weight basis.

First ester compounds (a) may be prepared by esterification of a glycerol alkoxylate, which itself may be prepared by reaction of an initiator compound glycerol with ethylene oxide, propylene oxide, or both ethylene oxide and propylene oxide to provide polyether segments of a, x, b, y. c, and z. The alkoxylation reaction is generally carried out in the presence of a catalyst. Any substance capable of accelerating the ring-opening addition of the alkylene oxide monomer(s) onto the glycerol initiator compound may be used, including acidic catalysts, basic catalysts, and coordination catalysts. Specific examples of catalysts include alkali or alkaline earth hydroxides such as potassium hydroxide, double metal cyanide (DMC) catalysts, mineral acids such as sulfuric acid and phosphoric acids, Lewis acids and Friedel-Crafts catalysts, boron trifluoride and its complexes with, e.g., methanol, ethanol, isopropanol, butanols, ethyl ether, butyl ether, and phenyl ether, as well as organic acids such as acetic acid, propionic acid, phenol, organic amines such as monomethylamine, monoethylamine, dimethylamine, triethylamine or piperidine, and tin chlorides and antimony chlorides. Alkali or alkaline earth hydroxides are often used. The reaction may be carried out, for example, at temperatures of about 20 to about 180° C., in some embodiments about 80 to about 160° C. Ethylene oxide and propylene oxide may be used in the alkoxylation reaction alone, to produce homopoly- or oligoalkylene oxide segments, or in sequence to produce block copolymer polyether segments (poly- or oligo(ethylene oxide)-co-poly- or oligo(propylene oxide) segments). Block copolymer segments may be prepared in either order: that is, either of the poly- or oligo(ethylene oxide) and poly- or oligo(propylene oxide) blocks may be added first onto the glycerol. It should be appreciated that the a, b, and c segments will typically all be formed from either ethylene oxide or propylene oxide, and likewise for the x, y, and z segments. The number of monomer units (a, b, c, x, y, z of the structure) of the ether segments may be controlled by amount or amounts of ethylene oxide and/or propylene oxide relative to glycerol.

The glycerol alkoxylate or a mixture of such glycerol alkoxylates is or are then esterified with one or more monocarboxylic acids having 2 to about 18 carbon atoms. The monocarboxylic acid or acids may be represented by the structural formulas

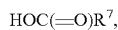

HOC(=O)R$^7$,

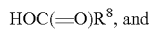

HOC(=O)R$^8$, and

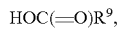

HOC(=O)R$^9$, in which R$^7$, R$^8$, and R$^9$ are as previously defined, or esterifiable derivative of such acids, including anhydrides, lower alkyl esters of such acids (e.g., methyl esters, which produce the relatively easy-to-remove by-product methanol), and the carboxylic acid halides (e.g., carboxylic acid chlorides and carboxylic acid bromides). One of R$^7$, R$^8$, and R$^9$ may be different from the others, or each if R$^7$, R$^8$, and R$^9$ may be different the others, and the esterification can produce one or a mixture of first ester compounds (a).

The esterification may be carried out with one or a mixture of monocarboxylic esters or esterifiable derviatives thereof. Carboxylic acids including heteroatoms or atoms other than carbon and hydrogen, e.g., O, F, N, S, Si may be used. Non-limiting examples of suitable carboxylic acids or esterifiable derviatives include for example acetic acid, acetic anhydride, propanoic acid, butyric acid, isobutanoic acid, pivalic acid, pentanoic acid, isopentanoic acid, hexanoic acid, heptanoic acid, octanoic acid, 2-ethylhexahoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, heptadecanoic acid, stearic acid, oleic acid, linoleic acid, palmitoleic acid, citronellic acid, undecenoic acid, lauric acid, undecylenic acid, myristic acid, linolenic acid, arachidic acid, behenic acid, tetrahydrobenzoic acid, hydrogenated or non-hydrogenated abietic acid, 2-ethylhexanoic acid, furoic acid, benzoic acid, 4-acetylbenzoic acid, 2-oxopropanoic (pyruvic) acid, 4-tert-butyl-benzoic acid, cyclopentane carboxylic acid, naphthenic acid, cyclohexane carboxylic acid, 2,4-dimethyl benzoic acid, 2-methyl benzoic acid, salicylic acid, isomers thereof, methyl esters thereof, and mixtures thereof.

Esterification is preferably carried out with acid or base catalysis; suitable catalysts for use in the transesterification include, but are not limited to, base catalysts, sodium methoxide, acid catalysts including inorganic acids such as sulfuric acid and acidified clays, organic acids such as methane sulfonic acid, substituted and unsubstituted benzenesulfonic acids, and para-toluenesulfonic acid, and acidic resins such as Amberlyst 15. Metals such as sodium and magnesium, and metal hydrides also are useful catalysts. The esterification temperature generally can be 80 to 250° C. In certain instances, the esterification reaction may preferably take place with the continuous removal of the water or alcohol (e.g. methanol) by-product. This is carried out, for example, at atmospheric pressure and/or stripping with nitrogen or reduced pressure or by using an entrainer, such as, for example, toluene, in the case of water as the by-product.

In various embodiments, the glycerol alkoxylate is esterified with one or more monocarboxylic acids having about 4 to about 9 carbon atoms or having an average of about 6 to about 8 carbon atoms on a weight basis. In various embodiments, the glycerol alkoxylate is esterified with one or more monocarboxylic acids selected from the group consisting of n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, and isononanoic acid. In various embodiments, it is particularly advantageous to esterify the glycerol alkoxylate with one or more monocarboxylic acids selected from the group consisting of n-butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecelenic acid, lauric acid, stearic acid isostearic acids, and combinations of these.

The second ester compound or compounds (b) has or have a representative structure (II)

(II)

wherein each of R$^{11}$ and R$^{12}$ is independently hydrogen (H) or methyl (CH$_3$); each of m and n is independently an integer and m+n is an integer of 1 to about 10; and R$^{10}$ and R$^{13}$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms and that may be substituted or unsubstituted.

In various embodiments, each of R$^{10}$ and R$^{13}$ may independently be straight-chain or branched-chain alkyl or alkenyl groups or substituted or unsubstituted cycloalkyl groups, each of which may contain heteroatoms such as O, F, N, S, or Si or may be hydrocarbyl groups. In various embodiments, each of R$^{10}$ and R$^{13}$ independently has about 3 to about 8 carbon atoms or R$^{10}$ and R$^{13}$ together have an average of about 5 to about 7 carbon atoms on a weight basis or both each of R$^{10}$ and R$^{13}$ independently has about 3 to about 8 carbon atoms and R$^{10}$ and R$^{13}$ together have an average of about 5 to about 7 carbon atoms on a weight basis.

In various embodiments, each of R$^{11}$ and R$^{12}$ is hydrogen (H) and/or m+n is an integer of about 2 to about 8 or of about 4 to about 10 or of about 2 to about 5 or of about 3 to about 5 or 2 or 3 or 4. In certain embodiments, the second ester compound or at least one of a plurality of second ester compounds is a triethylene glycol diester or a tetraethylene glycol diester, particularly a triethylene glycol diester or tetraethylene glycol diester of one or two monocarboxylic acids having about 4 to about 9 carbon atoms. Tetraethylene glycol diesters in particular provide an unexpected advantage for excellent miscibility in both R410a and R32 refrigerants. Tetraethylene glycol diesters of branched monocarboxylic acids also provide unexpectedly high viscosity indexes.

In various embodiments, each of $R^{11}$ and $R^{12}$ is hydrogen (H), so that the second ester compound (b) or at least one or a plurality of second ester compounds (b) has or representative structure (IV)

(IV)

wherein m is an integer of 1 to about 10; or of 2 to about 8; or of about 4 to about 10; or of about 2 to about 5; or of about 3 to about 5; or 2 or 3 or 4; and $R^{10}$ and $R^{13}$ are as previously defined, in some embodiments having about 3 to about 8 carbon atoms.

Second ester compounds (b) may be prepared by esterification of ethylene glycol, propylene glycol, or an oligo- or polyalkylene glycol, which may be an oligo- or polyethylene glycol, oligo- or polypropylene glycol, or a block ethylene glycol-propylene glycol copolymer, with one or two monocarboxylic acids having from 2 to about 18 carbon atoms. Both the etherification and the esterification reactions may be carried out by the methods already described for preparing the first ester compound or compounds (a). Nonlimiting, suitable examples of monocarboxylic acids or derivatives that may be used in preparing second ester compounds (b) are those already mentioned in conjunction with the preparation of first ester compounds (a).

In various embodiments, the ethylene glycol, propylene glycol, or oligo- or polyalkylene glycol is esterified with one or two monocarboxylic acids having about 4 to about 9 carbon atoms or having an average of from about 6 to about 8 carbon atoms on a weight basis. In various embodiments, the polyalkylene glycol is esterified with one or two monocarboxylic acids selected from the group consisting of n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, and isononanoic acid. In various embodiments, the polyalkylene glycol is esterified with one or two monocarboxylic acids selected from the group consisting of n-butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecelenic acid, lauric acid, stearic acid isostearic acid, and combinations of these. In various embodiments, the ether or ethers esterified with these monocarboxylic acids to produce the second ester compound or compounds is or are selected from diethylene glycol, triethylene glycol, tetraethylene glycol, pentaethylene glycol, hexaethylene glycol, heptaethylene glycol, octaethylene glycol, nonaethylene glycol, and decaethylene glycol.

The first ester compound or compounds (a) and the second ester compound or compounds (b) can be purified, for example, with cation or anion exchange, charcoal, molecular sieves, aluminum oxide, or by distillation (including vacuum distillation), or by a combination of such methods, to remove residual carboxylic acid.

In various embodiments, the first and second ester compounds are included in a weight ratio of about 20 to about 80% by weight of one or more first ester compounds and about 80 to about 20% by weight of one or more second ester compounds, or about 30 to about 70% by weight of one or more first ester compounds and about 70 to about 30% by weight of one or more second ester compounds, or about 40 to about 60% by weight of one or more first ester compounds and about 60 to about 40% by weight of one or more second ester compounds, in each case the combined weight of the first and second esters together being 100%. In various embodiments, the first ester compounds form a major portion of the mixture of the first and second esters by weight.

In embodiments in which the same monocarboxylic acid or the same combination of monocarboxylic acids is employed in making both the first ester compounds and the second ester compounds, then these ester compounds may be prepared together, and the amounts of glycerol alkoxylate and ethylene glycol, propylene glycol, or oligo- or polyalkylene glycol used may be selected so that the reaction product has a desired weight ratio of the first and second ester compounds.

In various embodiments, the first ester compound or compounds (a) and the second ester compound or compounds (b) together form at least about 50% by weight of the lubricant composition. The lubricant composition may include a minor portion of a lubricant compound that is not a first ester or second ester compound, such as a lubricant compound selected from polyol ester compounds (POE) other than the first and second ester compounds or polyalkylene glycols (PAG). A "minor portion" means less than 50 weight %. Nonlimiting examples of other lubricants that may be optionally be included in certain embodiments of the lubricant compositions are those prepared by the condensation of certain polyols such as pentaerythritol, neopentyl glycol and trimethylpropanol, and linear or branched monocarboxylic acids containing about 4 to 10 carbon atoms and those polyol esters (POE) and polyalkylene glycol (PAG) lubricants described in Sorensen et al., U.S. Pat. No. 6,290,869, Corr, U.S. Pat. No. 6,245,254; Duncan et al., U.S. Pat. No. 5,750,750, Salomon et al, U.S. Pat. No. 5,366,648, Fukuda et al, U.S. Pat. No. 5,185, 092, Corr et al., US Pat. Appl. Pub. 2002/0013233, Schlossberg et al., US Pat. Appl. Pub. 2003/0201420, among others (the respective relevant portions of which are incorporated herein by reference). Polyvinyl ether (PVE) lubricants may also be used.

In various embodiments, the lubricant composition includes as lubricants solely the mixture of one or more first ester compounds (a) and one or more second ester compounds (b).

One or more additives may be included in any combination in the lubricant compositions. Nonlimiting examples of suitable additives include antioxidants, anti-wear agents, extreme-pressure agents, friction-reducing agents, silicone-based and other types of antifoaming agents, metal inactivating agents such as benzotriazoles, viscosity index improvers, pour point depressants, detergent dispersants, stabilizers, corrosion inhibitors, flammability suppressants, acid scavengers and the like. Such additives may be used alone or in any combination of two or more. There are no particular restrictions on the inclusion of such additives. Generally, additives such as these may be present at less than or equal to about 10% by weight of the lubricant composition. Various embodiments of the lubricant composition may include about 0.1 to about 5% by weight of an additive or a combination of additives or about 0.2 to about 2% by weight of an additive or a combination of additives.

Nonlimiting examples of the antioxidants that can be used include phenolic antioxidants such as 2,6-di-t-butyl-4-methylphenol and 4,4'-methylenebis(2,6-di-t-butylphenol), and bisphenol A, amine and thiazine antioxidants such as p,p-dioctylphenylamine, monooctyldiphenylamine, phenothiazine, 3,7-dioctylphenothiazine, N,N-di(2-naphthyl)-p-phenylenediamine, phenyl-1-naphthylamine, phenyl-2-naphthylamine, alkylphenyl-1-naphthylamines, and alkylphenyl-2-naphthylamines; sulfur-containing antioxidants such as alkyl disulfide, thiodipropionic acid esters and benzothiazole; and zinc compounds such as zinc dialkyl dithiophosphates and zinc diaryl dithiophosphates. The lubricant composition may comprise up to about 5.0 weight % antioxidants, about 0.1 to about 5 weight %, about 0.1 to about 2.0 weight %, or about 0.2 to about 0.8 weight % antioxidants. The lubricant compositions may include one or a combination of two or more antioxidant compounds.

In certain embodiments, the lubricant compositions may include one or more additives, such as extreme pressure/antiwear additives, metal inactivating agents (also called metal deactivators or passivators), corrosion inhibitors, antioxidants, and so on. Nonlimiting examples of corrosion inhibitors and metal inactivating agents include diaryl sulfides, arylalkyl sulfides, dialkyl sulfides, diaryl disulfides, arylalkyl disulfides, dialkyl disulfides, diaryl polysulfides, arylalkyl polysulfides, and dialkyl polysulfides, such as dibenzyl disulfide and dioctyl sulfide, dithiocarbamates such as methylene-bis-dibutyldithiocarbamate, derivatives of 2-mercaptobenzothiazole such as 1-[N,N-bis(2-ethylhexyl) aminomethyl]-2-mercapto-1H-1,3-benzothiazole, derivatives of 2,5-dimercapto-1,3,4-thiadiazole such as 2,5-bis(tert-nonyldithio)-1,3,4-thiadiazole and 2,5-bis(n-octyldithio)-1,3,4-thiadiazole, which may be used alone or in any combination. Nonlimiting examples of extreme pressure/antiwear additives include phosphoric acid esters, acidic phosphoric acid esters, branched alkyl amine phosphates containing 5 to 20 carbon atoms, thiophosphoric acid esters, acidic phosphoric acid ester amine salts, chlorinated phosphoric acid esters and phosphorous acid esters that are esters of phosphoric acid or phosphorous acid with alkanols or polyether alcohols, zinc salts of thiophosphoric acid esters, or derivatives of such. Specific, nonlimiting examples of phosphoric acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate. Specific, nonlimiting examples of acidic phosphoric acid esters there may be mentioned monobutyl acid phosphate, monopentyl acid phosphate, monohexyl acid phosphate, monoheptyl acid phosphate, monooctyl acid phosphate, mononoyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate. Specific, nonlimiting examples of thiophosphoric acid esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate. Specific, nonlimiting examples of amine salts of acidic phosphoric acid esters include salts of acidic phosphoric acid esters with amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. Specific, nonlimiting examples of chlorinated phosphoric acid esters include tris(dichloropropyl) phosphate, tris(chloroethyl) phosphate, tris(chlorophenyl) phosphate, and polyoxyalkylene bis[di(chloroalkyl)]phosphate. Phosphorous acid esters that may be mentioned include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite. Zinc salts of thiophosphoric acid esters that may be mentioned include zinc dialkyl dithiophosphate and zinc diaryl dithiophosphate. These additives may be used individually or in any combination, in any desired amount. In various embodiments, the lubricant composition may include about 0.01 weight % to about 5.0 weight %, about 0.01 weight % to about 4.0 weight %, about 0.02 weight % to about 3.0 weight %, or 0.1 weight % to about 5.0 weight % each of the additives. These additives may be used alone or in any combination with each other or with other additives such as antioxidants, oiliness agents, antifoaming agents, viscosity index improvers, pour point depressants, detergent dispersants, stabilizers, flammability suppressants, and acid scavengers.

To enhance thermal and chemical stability, the disclosed lubricant compositions may include an acid scavenger. Nonlimiting examples of suitable acid scavengers include epoxide compounds selected from among phenylglycidyl ether-type epoxy compounds, alkylglycidyl ether-type epoxy compounds, glycidyl ester-type epoxy compounds, allyloxirane compounds, alkyloxirane compounds, alicyclic epoxy compounds, epoxidized fatty acid monoesters and epoxidized vegetable oils. Specific, nonlimiting examples of phenylglycidyl ether-type epoxy compounds include phenyl glycidyl ethers and alkylphenyl glycidyl ethers. The alkylphenyl glycidyl ethers may have one to three $C_1$-$C_{13}$ alkyl groups, preferred examples of which include those with one $C_4$-$C_{10}$ alkyl group such as n-butylphenyl glycidyl ether, iso-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether and decylphenyl glycidyl ether. Specific, nonlimiting examples of alkyl glycidyl ether-type epoxy compounds include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropanetriglycidyl ether, pentaerythritoltetraglycidyl ether, 1,6-hexanediol diglycidyl ether, sorbitolpolyglycidyl ether, polyalkyleneglycol monoglycidyl ether and polyalkyleneglycol diglycidyl ether. Specific, nonlimiting examples of glycidyl ester-type epoxy compounds include phenylglycidyl esters, alkylglycidyl esters and alkenylglycidyl esters such as glycidyl-2,2-dimethyl octanoate, glycidyl benzoate, glycidyl acrylate and glycidyl methacrylate. Specific, nonlimiting examples of allyloxirane compounds include 1,2-epoxystyrene and alkyl-1,2-epoxystyrenes. Specific, nonlimiting examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyeicosane. Specific, nonlimiting examples of alicyclic epoxy compounds' include 1,2-epoxycyclohexane, 1,2-epoxycyclopentane, 3,4-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1-.0]heptane, 4-(1'-methylepoxyethyl)-1,2-epoxy-2-methylcyclohexane and 4-epoxyethyl-1,2-epoxycyclohexane. Specific, nonlimiting examples of epoxidized fatty acid monoesters include epoxidated esters of $C_{12}$-$C_{20}$ fatty acids and $C_1$-$C_8$ alcohols or phenols or alkylphenols such as butyl, hexyl, benzyl, cyclohexyl, methoxyethyl, octyl, phenyl and butylphenyl esters of epoxystearic acid. Specific, nonlimiting examples of epoxidized vegetable oils include epoxy compounds of vegetable oils such as soybean oil, linseed oil and cottonseed oil. The acid scavenger content is not particularly restricted but may be 0.1-5.0% by weight or 0.2-2.0% by weight based on the total weight of the lubricant composition. An acid scavenger may be used alone, or two or more may be used in combination.

In certain aspects a heat transfer device through which the lubricant composition and refrigerant mixture passes may include a filter. Such a filter may include molecular sieves, aluminum oxide charcoal, or another such absorbent(s) through which the lubricant composition and refrigerant mixture passes to remove impurities such as low molecular weight acids and moisture.

Nonlimiting examples of the antifoaming agents that can be used include silicone oils such as dimethylpolysiloxane and organosilicates such as diethyl silicate. Nonlimiting examples of metal inactivating agents that can be used include benzotriazole, tolyltriazole, alizarin, quinizarin and mercaptobenzothiazole. Nonlimiting examples of moisture scavengers include trialkylorthoformates such as trimethylorthoformate and triethylorthoformate, ketals such as 1,3-dioxacyclopentane, and amino ketals such as 2,2-dialkyloxazolidines.

In various embodiments, the lubricant composition may include one or more corrosion inhibitors, such as those selected from isomeric mixtures of N,N-bis(2-ethylhexyl)-4-methyl-1H-benzotriazole-1-methylamine and N,N-bis(2-ethylhexyl)-5-methyl-1H-benzotriazole-1-methylamine.

The lubricating composition may include about 0.01 to about 1.0 weight % of one or more corrosion inhibitors, about 0.01 to about 0.5 weight % of one or more corrosion inhibitors, or about 0.05 to about 0.15 weight % of one or more corrosion inhibitors.

Nonlimiting examples of suitable viscosity improvers that may be included in the lubricant compositions are polyolefins, such as ethylene-propylene copolymers, or polybutylene rubbers, including hydrogenated rubbers, such as styrene-butadiene or styrene-isoprene rubbers; or polyacrylates, including polymethacrylates and those described in Huang et al., U.S. Patent Publication No. 2010/0292114, the relevant portions of which are incorporated herein by reference.

Nonlimiting examples of pour point depressants include polyalkyl methacrylates, polyalkyl acrylates, polyvinyl acetate, polyalkylstylenes, polybutene, condensates of chlorinated paraffin and naphthalene, condensates of chlorinated paraffin and phenol Detergent dispersants may be broadly classified into metal-based detergents that contain a metal, and ashless dispersants that contain no metal. Nonlimiting examples of the former include colloids prepared by dispersing a metal hydroxide or carbonate in a neutral or basic sulfonate, overbased sulfonate, overbased phenate, overbased salicylate, phosphonate, overbased carboxylate or the like. Nonlimiting of the metal include calcium, magnesium, barium or the like. Examples of the ashless dispersants include mono-succinimides, bis-succinimides or the like.

Nonlimiting examples of flammability suppressants include trifluorochloromethane, trifluoroiodomthane, phosphate esters and other phosphorous compounds, and iodine- or bromine-containing hydrocarbons, hydrofloroarbons, or fluorocarbons.

The mixture of first and second ester compounds in the lubricant composition can be adjusted to provide an optimum viscosity for the heat transfer device, compressor, and refrigerant or refrigerants with which the lubricant composition is employed. In general, viscosity of the lubricant composition increases when the mixture is changed to increase the weight percent of first ester compound or compounds (a) or when the first and second ester compounds are changed (referring to representative structures I-IV) to increase the values of a, b, c, m, n, x, y, and/or z (i.e., to increase the length of the ether segments) or to increase the amount of non-linear $R^7$, $R^8$, and $R^9$, $R^{10}$ and $R^{13}$ moieties (i.e., to increase branching of the ester moieities), or by a combination of these. Viscosity is usually expressed as kinematic viscosity, which is measured according to ASTM D445. Lubricity, which can be determined according to ASTM D2670, can be increased by decreasing the amount of non-linear $R^7$, $R^8$, and $R^9$, $R^{10}$ and $R^{13}$ moieties (i.e., by increasing the amount of straight-chain ester groups). The lubricant compositions in various embodiments may have a viscosity index of at least about 150, and typically the lubricant compositions may have a viscosity index of least about 200, particularly when the lubricants in the lubricant composition consist of or essentially consist of the mixture of the first and second esters. Viscosity index can be determined according to ASTM D2270.

In certain embodiments, about 20 weight % of the lubricant composition added to about 80 weight % of a refrigerant retains a one liquid phase at remarkably low temperatures, particularly when the lubricants in the lubricant composition consist of or essentially consist of the mixture of the first and second ester compounds, and particularly when the refrigerant is selected from R410a, R32, and HFO refrigerants or combinations of these refrigerants or combinations including these refrigerants. The miscibility temperature range of a lubricant composition in a refrigerant is determined by combining the lubricant composition (20% by weight) and the refrigerant (80% by weight) gravimetrically to a heavy-walled glass test tube. The tube is sealed, and the mixture of lubricant and refrigerant in the sealed tube is visually observed while being cooled or warmed. The temperature at which phase separation is visually observed is designated as the limit of miscibility. The maximum miscibility temperature is the highest temperature before phase separation is observed; the minimum miscibility temperature is the lowest temperature before phase separation is observed. In various embodiments, the lubricant and refrigerant combinations with the lubricant composition have a minimum miscibility temperature of about −40° C. or lower or of about −55° C. or lower or of about −70° C. or lower. In various embodiments, the minimum miscibility temperature may be of lubricant and refrigerant combinations in which the refrigerant is selected from R410a, R32, and HFO refrigerants or combinations of these refrigerants or combinations including these refrigerants.

The moisture content of the lubricant compositions is not particularly restricted but in certain cases is not greater than about 500 ppm, or not greater than about 300 ppm, or not greater than about 200 ppm, based on the total amount of the lubricant composition. A lower moisture content is desired from the viewpoint of effect on the thermal and chemical stability and electrical insulating properties of the lubricant composition, especially for use in hermetic type refrigerating machines. The moisture content may be measured by the Karl Fisher method (ASTM D4928-83).

The acid value of the lubricant composition is also not particularly restricted, but in order to prevent corrosion of metals used in the refrigerating machine or parts, and in order to prevent decomposition of the esters in the lubricant composition, it may be kept to not greater than about 0.1 mg KOH/g, particularly not greater than about 0.05 mg KOH/g. The acid value may be measured by titrating a known amount of lubricant composition with 0.01 to 0.1N NaOH.

The disclosed lubricant compositions may be combined with one or more refrigerant compounds to form a lubricant-refrigerant combination, or working fluid, for use in a heat transfer device. Working refrigeration fluids generally include a minor amount of the lubricant composition. Thus, the lubricant and refrigerant are combined in amounts so that there is relatively more refrigerant than lubricant in the lubricant-refrigerant compositions. Based on the combined weight of lubricant and refrigerant, the refrigerant is greater than 50% by weight and the lubricant is less than 50% by weight of the combined weight. In various embodiments, the lubricant is about 1 to about 30% by weight of the combined weight of lubricant and refrigerant or from 5 to about 20% by weight of the combined weight of lubricant and refrigerant. Typically, the working fluids include between about 5 to about 20 or optionally about 5 to about 15 weight % of lubricant with a balance being the refrigerant. The lubricant composition may be adjusted for optimum compatibility with the refrigerant with which it will be used in a refrigeration compressor or heat transfer device.

A single refrigerant or a mixture of refrigerants may be used. In particular embodiments, the refrigerant may be a single compound or it may be a mixture of compounds. The mixture may be an azeotrope, zeotrope, or close boiling point mixture.

The disclosed lubricant compositions have unexpected benefits used with R410a, R32, and HFO refrigerants, but may also be used with other refrigerants. Nonlimiting examples of refrigerants that may be used with the disclosed lubricant compositions include hydrocarbons, chlorofluorocarbons, hydrochlorofluorocarbons, fluorocarbons, and hydrofluorocarbons, Particular, nonlimiting examples of useful refrigerants include propane, n-butane, isobutene, 2-methylbutane, n-pentane, trichlorofluoromethane (CFC-11), dichlorodifluoromethane (CFC-12), difluoromethane (HFC-32), pentafluoroethane (HFC-125), 1,1,2,2-tetrafluoroethane (HFC-134), 1,1,1,2-tetrafluoroethane (HFC-134a), difluoroethane (HFC-152a), fluoroethane (HFC-161), 1,1,1,2,3,3,3-heptafluorpropane (HFC-227ea), 1,1,1,2,3,3-hexafluorpropane (HFC-236ea), 1,1,1,3,3,3-hexafluorpropane (HFC-236fa), 1,1,1,3,3-pentafluorpropane (HFC-245fa), 1,1,1,3,3-pentafluorbutane (HFC-365mfc), and HFO refrigerants.

HFO refrigerants include $C_2$ to $C_8$ fluoroalkenes, especially straight-chain or branched ethylenes having 1 to 3 fluorine atoms, propenes having 1 to 5 fluorine atoms, butenes having 1 to 7 fluorine atoms, pentenes having 1 to 9 fluorine atoms, hexenes having 1 to 11 fluorine atoms; cyclobutenes having 1 to 5 fluorine atoms, cyclopentenes having 1 to 7 fluorine atoms, and cyclohexenes having 1 to 9 fluorine atoms. Nonlimiting suitable examples of specific refrigerants of this kind include 3,3,3-trifluoropropene (HFO-1234zf), HFO-1234 refrigerants like 2,3,3,3-tetrafluoropropene (HFO-1234yf), 1,2,3,3-tetrafluoropropene (HFO-1234yf), cis- and trans-1,3,3,3-tetrafluoropropene (HFO-1234ye), pentafluoropropenes (HFO-1225) such as 1,1,3,3,3, pentafluoropropene (HFO-1225zc) or those having a hydrogen on the terminal unsaturated carbon such as 1,2,3,3,3, pentafluoropropene (HFO-1225yez), fluorochloropropenes such as trifluoro, monochloropropenes (HFO-1233) like $CF_3CCl=CH_2$ (HFO-1233xf) and $CF_3CH=CHCl$ (HFO-1233zd), many of which are described in Smutny, U.S. Pat. No. 4,788,352 and Singh et al., US Patent Application Publication 2008/0099190, the disclosures of both documents being incorporated herein by reference. The refrigerants may be used in combination, including combinations of fluoroalkene refrigerants with saturated hydrofluorocarbons, $C_3$-$C_8$ hydrocarbon, dimethyl ether, carbon dioxide, bis(trifluoromethyl)sulfide, and trifluoroiodomethane refrigerants.

In certain aspects, the disclosed lubricant compositions have unexpected benefits when used with R410a (a near-azeotropic mixture of difluoromethane (R32) and pentafluoroethane (R125)) or difluoromethane (R32) or HFO refrigerants or any combinations of R410a, R32, and HFOs; but the lubricant compositions of the present teachings may also be used with other refrigerants. As discussed above, suitable exemplary HFO refrigerants include 1,1,1,2-tetrafluoropropene (HFO-1234yf), both cis- and trans-1,1,1,3-tetrafluoropropene (HFO-1234ze), 1,1,1trifluoro-2, chloro-propene (HFCO-1233xf), and both cis- and trans-1,1,1-trifluo-3, chloropropene (HFCO-1233zd), by way of nonlimiting example.

The disclosed lubricant and refrigerant combinations may be used in compression-type heat transfer devices. Nonlimiting examples of compression-type heat transfer devices are compressor systems for refrigerators, heat pumps, and air conditioning equipment, including auto, home, commercial, and industrial air conditioners. The lubricant composition is used in sufficient amount to provide lubrication for the compressor. In these devices, the refrigerant typically evaporates at low pressure taking heat from the surrounding zone. The resulting vapor is then compressed and passed to a condenser where is condenses and gives off heat to a second zone. The condensate is then returned through an expansion valve to the evaporator, so completing the cycle. The mechanical energy required for compressing the vapor and pumping the fluid is provided by, for example, an electric motor or internal combustion engine.

Types of compressors useful for the above applications can be classified into two broad categories; positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, rotary (rolling piston, rotary vane, single screw, twin screw), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles. Details of the design and function of these compressors for refrigeration applications can be found in the 2010 ASHRAE Handbook, HVAC systems and Equipment, Chapter 37, incorporated herein by reference.

The working fluids comprising the lubricant composition and a refrigerant or refrigerants can be used in a wide variety of refrigeration and heat energy transfer applications, in some cases particularly industrial or commercial air-conditioning units, e.g. for factories, office buildings, apartment buildings, warehouses, and ice skating rinks, or for retail sale.

It is generally desirable for the lubricant composition to be soluble in the refrigerant (or combination of refrigerants) at concentrations of about 5 to 20 weight % over a temperature range of about −40° C. or lower to about 40° C. or higher, depending on the application. In addition to miscibility of lubricant and refrigerant, the refrigerant-lubricant combination must have suitable viscosity characteristics for the particular equipment and application.

EXAMPLES

In the following examples, properties are determined by the following methods.

Kinematic viscosity is measured according to ASTM D445.

Lubricity is measured according to ASTM D2670.

Viscosity index is determined according to ASTM D2270.

The miscibility temperature range of a lubricant composition in a refrigerant is determined as follows: The lubricant composition (20% by weight) and the refrigerant (80% by weight) are added gravimetrically to a heavy-walled glass test tube. The tube is then sealed. The mixture of lubricant and refrigerant in the sealed tube is visually observed while being cooled (generally to no lower than −40° C.) and warmed (generally to no higher than 78° C.). The temperature at which phase separation is visually observed was designated as the limit of miscibility. The maximum miscibility temperature is the highest temperature before phase separation is observed; the minimum miscibility temperature is the lowest temperature before phase separation is observed.

Ethoxylated Glycerol Ester Preparation A (by procedures A-1 and A-2) and Triethylene Glycol Ester Preparations B and C represent the generalized procedures to synthesize all the esters use in the examples. These generalized preparation procedures will be referred to for the preparations of the other esters used in the examples, together with specific weights of reagents and any deviation from the generalized procedures used to prepare each ester.

Preparation A. Preparation of Glycerol Ethoxylate ($M_n$~1000) Esterified with a Mixture of Carboxylic Acids This ester is prepared by either of two procedures, A-1 or A-2.

A-1 No Solvent Procedure

To a 2-liter reactor equipped with a mechanical stirrer, water trap, nitrogen source, thermocouple, and reflux condenser are added 500 grams of glycerol ethoxylate ($M_n$~1000) and 210 grams of a carboxylic acid mixture (34 weight % n-pentanoic acid, 44 weight % n-heptanoic acid, and 22 weight % 3,3,5-trimethylhexanoic acid) all at once. This is followed by the addition of 0.25 grams of tin(II) oxylate. The mixture is stirred under a nitrogen blanket and slowly heated to 230° C. over approximately 4 hours. During this heating period, the water of reaction is collected in the water trap; any carboxylic acid distilled is returned to the reactor. After 3 hours at 230° C., the reaction mixture is cooled to approximately 80° C. and filtered through Whatman #1 filter paper. The resulting oil is then subjected to straight take-over distillation between 0.2 and 0.4 Torr to remove residual volatile carboxylic acids. Afterwards, the residual oil is passed through a column of charcoal and aluminum oxide to give 458 grams of esterified glycerol ethoxylate.

A-2. Azeotropic Distillation of Water Procedure

To a 1-liter, single-necked, round-bottom flask equipped with a magnetic stirrer, Dean-Stark water trap, and reflux condenser are added 200 grams of glycerol ethoxylate ($M_n$~1000) and 84.8 grams of a carboxylic acid mixture (34 weight % n-pentanoic acid, 44 weight % n-heptanoic acid, and 22 weight % 3,3,5-trimethylhexanoic acid) all at once. This is followed by the addition of 1.90 grams of p-toluenesulfonic acid and 400 mL of toluene. The reaction mixture is stirred and heated under reflux until 11 mL of water is collected. After cooling to room temperature, the reaction mixture is washed four times with 250 mL of 5% $NaOH_{aq}$, twice with 250 mL of water, and once with 250 mL of saturated $NaCl_{aq}$. The solution is dried with anhydrous $Na_2SO_4$ and filtered. Afterwards the solution is subjected to roto-evaporation to give 197 grams of esterified glycerol ethoxylate.

Preparation B. Preparation of Triethylene Glycol Esterified with a Mixture of Carboxylic Acids (No Solvent)

To a 2-liter reactor equipped with a mechanical stirrer, water trap, nitrogen source, thermocouple, and reflux condenser are added 270 grams of triethylene glycol, 451 grams of a carboxylic acid mix (34 weight % n-pentanoic acid, 44 weight % n-heptanoic acid, and 22 weight % 3,3,5-trimethylhexanoic acid) followed by 0.20 grams of tin (II) oxalate all at once. Under a blanket of nitrogen, the mixture is slowly heated to 220° C. in about 6 hours. During this heating period, the water of reaction is collected in the water trap and any carboxylic acids distilled are returned to the reactor. This reaction mixture is held at 220° C. for little over 1 hour, then raised to 230° C. momentarily, and then cooled to room temperature. Afterwards, the reaction product is subjected to fractional vacuum distillation through a 2 cm-diameter-by-18 cm-length Vigreux column. The material that distilled between 192 and 232° C. at 0.3 Torr is collected to give 532 grams of esterified triethylene glycol.

Preparation C. Preparation of Triethylene Glycol Esterified with 3,3,5-Trimethylhexanoic Acid (Azeotropic Distillation of Water)

To a 1-liter, single-necked, round-bottom flask equipped with a magnetic stirrer, Dean-Stark water trap, and reflux condenser are added 75 grams of triethylene glycol, 166 grams of 3,3,5-trimethylhexanoic acid, 0.95 grams of p-toluenesulfonic acid, and 200 mL of toluene all at once. The reaction mixture is stirred and heated under reflux until ~19 mL of water is collected. Afterwards, the reaction product is cooled to room temperature and washed three times with 250 mL of 5% $NaOH_{aq}$, twice with 250 mL of water, and dried over $MgSO_4$. The mixture is then filtered and subjected to roto-evaporation. The resulting oil is then distilled through a 2 cm-diameter-by-18 cm-length Vigreux column, and the material distilled between 201 to 218° C. at 0.1 to 0.2 Torr is collected. This material is 176 grams of esterified triethylene glycol.

Preparation D. Preparation of Glycerol Ethoxylate ($M_n$~1000) Esterified with 3,3,5-Trimethylhexanoic Acid (No Solvent)

The ester of Preparation D is made as in Preparation A, using 500 grams of glycerol ethoxylate ($M_n$~1000), and 249 grams of 3,3,5-trimethylhexanoic acid to give 567 grams of product.

Preparation E. Preparation Glycerol Ethoxylate (Mn~1240) Esterified with a Mixture of Carboxylic Acids (No Solvent)

The ester of Preparation E is made as in Preparation A, using 620 grams of glycerol ethoxylate (Mn~1240) and 195 grams of a carboxylic acid mixture (34 weight % n-pentanoic acid, 44 weight % n-heptanoic acid, and 22 weight % 3,3,5-trimethylhexanoic acid) to give 730 grams of product. The product is subjected to straight take-over vacuum distillation (0.35 Torr, 41-47° C.) to remove residual volatile material.

Preparation F. Preparation of Glycerol Ethoxylate (Mn~1240) with 3,3,5-Trimethylhexanoic Acid (No Solvent)

The ester of Preparation F is made as in Preparation A starting with 620 grams of glycerol ethoxylate (Mn~1240) and 248 grams of 3,3,5-trimethylhexanoic acid to give 534 grams of product.

Examples 1-11

Lubricants According to the Inventive Technology

The 78% linear esters of Preparation A and Preparation B were combined in the weight ratios indicated in Examples 1 through 8 and tested for the properties shown. In a like manner the 100% branched esters of Preparation D and Preparation C were combined in the weight ratios indicated in Examples 9 through 11 and tested for the properties shown.

Conventionally, it was understood that more highly branched esters are significantly more miscible in refrigerants than the straight chain analogs. In the lubricant compositions of glycerol ethoxylate esters and polyalkylene glycol esters according to the inventive technology; however, both highly branched and highly linear compositions surprizingly have nearly equal miscibilities in both R410a and R32. This is demonstrated in FIGS. 1-5, in which the abbreviation % iC9 refers to the weight percent of isononoate (3,3,5-trimethylhexanoate) ester in the lubricant composition, with 100% iC9 meaning that both glycerol ethoxylate and polyalkylene glycol esters were prepared using only 3,3,5-trimethylhexanoic acid as the esterifying acid and 22% iC9 meaning that both glycerol ethoxylate and polyalkylene glycol esters were prepared using a mixture of 22 wt. % isononanoic (3,3,5-trimethylhexanoic) acid, 34 wt. % normal-pentanoic acid, and 44 wt. % normal-heptanoic acid as the esterifying acids. The esters of Preparations C, D, and F are prepared using only 3,3,5-trimethylhexanoic acid as the esterifying acid, and lubricant compositions made from these preparations are designated as 100% iC9 in the Figures. Preparations A. B, and E are prepared using a mixture of 22 wt. % isononanoic (3,3,5-trimethylhexanoic) acid, 34 wt. % normal-pentanoic acid, and 44 wt. % normal-heptanoic acid, and lubricant compositions made from these preparations are designated as 22% iC9 in the Figures.

In FIG. 1, the 4° C. kinematic viscosities (determined according to ASTM D445) of lubricant compositions containing combinations of Preparations A and B as shown in Table 2 are graphed as curve 22% iC9, and the 40° C. kinematic viscosities of lubricant compositions containing combinations of Preparations D and C as shown in Table 3 are graphed as curve 100% iC9. FIG. 1 compares the 40° C. kinematic viscosities of lubricant compositions of curve 100% iC9, combinations of the highly branched esters of ethoxylated glycerol (Mn~1000) and triethylene glycol, to a 40° C. kinematic viscosities of lubricant compositions of curve 22% iC9, combinations of highly linear esters of ethoxylated glycerol (Mn~1000) and triethylene glycol. The lubricant compositions of curve 100% iC9 having a higher degree of branching exhibit higher viscosities relative to curve 22% iC9.

TABLE 1

| | Lubricant composition, % by weight | | | | Properties | | | |
|---|---|---|---|---|---|---|---|---|
| Example | Preparation A | Preparation B | Preparation D | Preparation C | Kinematic Viscosity (cSt) at 40° C./100° C. | Viscosity Index | Miscibility in R410a (° C.) | Miscibility in R32 (° C.) |
| Example 1 | — | 100 | — | — | 6.97/2.28 | 154 | 72 to −70* | |
| Example 2 | 30 | 70 | — | — | | | 39 to −70* | 56 to −40* |
| Example 3 | 40 | 60 | — | — | | | 41 to −70* | |
| Example 4 | 50 | 50 | — | — | 21.3/5.48 | 214 | 18** to −57* | |
| Example 5 | 60 | 40 | — | — | 29/6.8 | 204 | 32 to −60 | 25 to −60 |
| Example 6 | 68 | 32 | — | — | 35.6/7.40 | 181 | 18** to −57* | |
| Example 7 | 85 | 15 | — | — | 45.0/9.79 | 211 | | |
| Example 8 | 100 | — | — | — | 62.6/12.7 | 208 | −7.8 to −57* | |
| Example 9 | — | — | — | 100 | 13.4/3.46 | 141 | 72 to −70* | |
| Example 10 | — | — | 25 | 75 | 22.2/5.08 | 167 | | 56 to −40* |
| Example 11 | — | — | 30 | 70 | | | 39 to −70* | |

*Temperature limit tested
**The upper temperature limit of miscibility was not determined.

TABLE 2

Curve 22% iC9 - Ethoxylated Glycerol ($M_n$ ~1000) Esterified with Mixed Acids (Preparation A) Blended with Triethylene Glycol Esterified with Mixed Acids (Preparation B)

| Preparation A (weight %) | Preparation B (weight %) | 40° C. Viscosity (cSt.) |
|---|---|---|
| 0 | 100 | 6.97 |
| 50 | 50 | 21.3 |
| 60 | 40 | 29 |
| 68 | 32 | 35.6 |
| 85 | 15 | 45 |
| 100 | 0 | 62.6 |

TABLE 3

Curve 100% iC9 - Ethoxylated Glycerol ($M_n$ ~1000) Esterified with 3,3,5-Trimethylhexanoic Acid (Preparation D) Blended with Triethylene Glycol Esterified with 3,3,5-Trimethylhexanoic Acid (Preparation C)

| Preparation D (weight %) | Preparation C (weight %) | 40° C. Viscosity (cSt.) |
|---|---|---|
| 0 | 100 | 13.4 |
| 25 | 75 | 22.2 |
| 38 | 62 | 28.2 |
| 50 | 50 | 36.2 |
| 100 | 0 | 92.2 |

Figure 2:
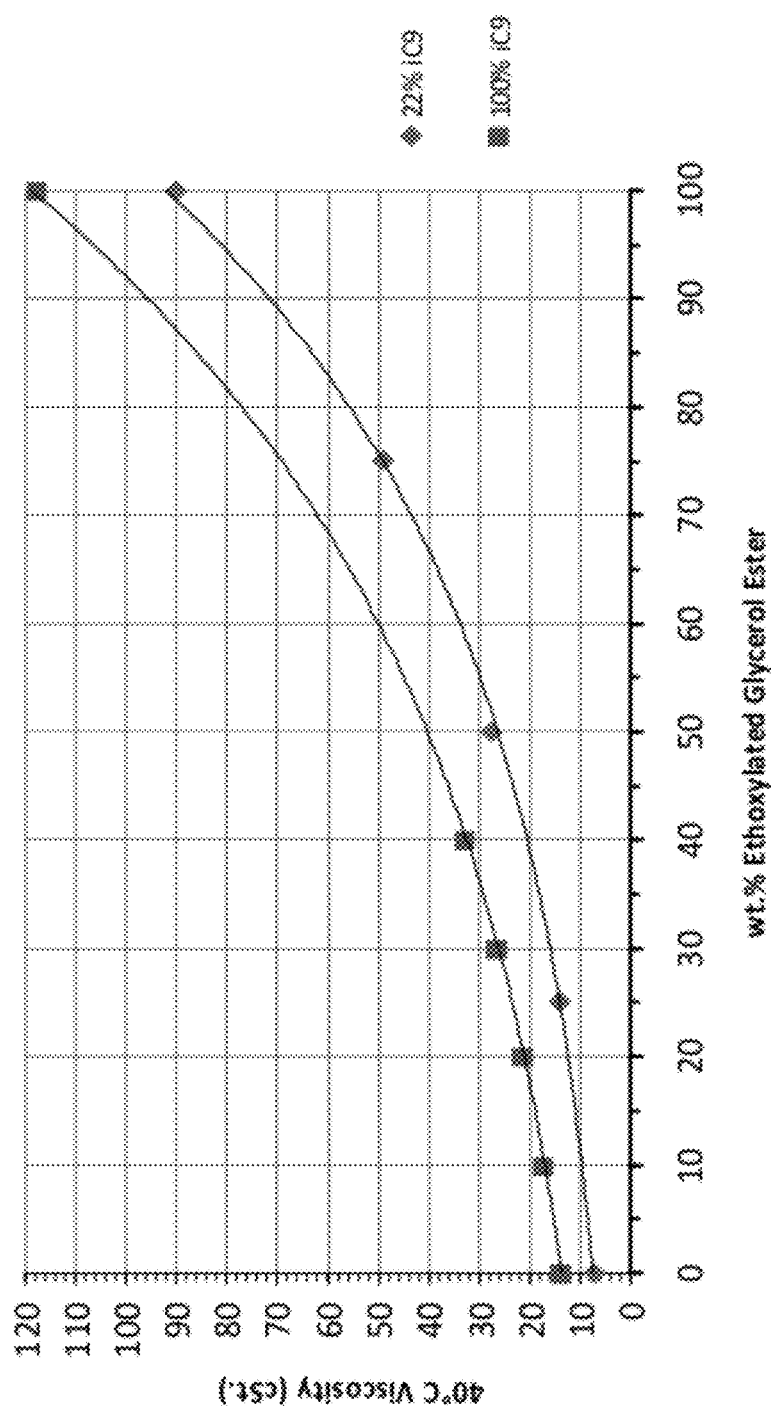
FIG. 2 is a graph of kinematic viscosities of certain lubricant compositions of the invention as disclosed measured according to ASTM D445.

FIG. 2 is similar to FIG. 1 in that it compares the 40° C. viscosities (determined according to ASTM D445) of highly branched lubricant esters, curve 100% iC9, with highly linear lubricant esters, curve 22% iC9. However, the starting ethoxylated glycerol in FIG. 2 was of a higher molecular weight ($M_n$~1240) than that in FIG. 1. In FIG. 2, the curve 100% iC9 graphs lubricant compositions made by combining Preparations F and C as given in Table 5, while curve 22% iC9 graphs lubricant compositions made by combining Preparations E and B, as given in Table 4. In FIG. 2, the lubricant compositions of curve 100% iC9 are more highly branched and exhibit higher viscosities relative to curve 22% iC9. That lubricant esters with higher degrees of branching exhibit correspondingly higher viscosities is typical. Indeed, on an equal molecular and individual ester basis the ester lubricants display typical viscosity behavior.

TABLE 4

Curve 22% iC9 - Ethoxylated Glycerol ($M_n$ ~1240) Esterified with Mixed Acids (Preparation E) Blended with Triethylene Glycol Esterified with Mixed Acids (Preparation B)

| Preparation E (weight %) | Preparation B (weight %) | 40° C. Viscosity (cSt.) |
|---|---|---|
| 0 | 100 | 6.97 |
| 25 | 75 | 14.01 |
| 50 | 50 | 27.46 |
| 75 | 25 | 49.05 |
| 100 | 0 | 90.1 |

TABLE 5

Curve 100% iC9 - Ethoxylated Glycerol ($M_n$ ~1240) Esterified with 3,3,5-Trimethylhexanoic Acid (Preparation F) Blended with Triethylene Glycol Esterified with 3,3,5-Trimethylhexanoic Acid (Preparation C)

| Preparation F (weight %) | Preparation C (weight %) | 40° C. Viscosity (cSt.) |
|---|---|---|
| 0 | 100 | 13.4 |
| 10 | 90 | 16.95 |
| 20 | 80 | 21.09 |
| 30 | 70 | 26.5 |
| 40 | 60 | 32.75 |
| 100 | 0 | 117.7 |

Figure 3:
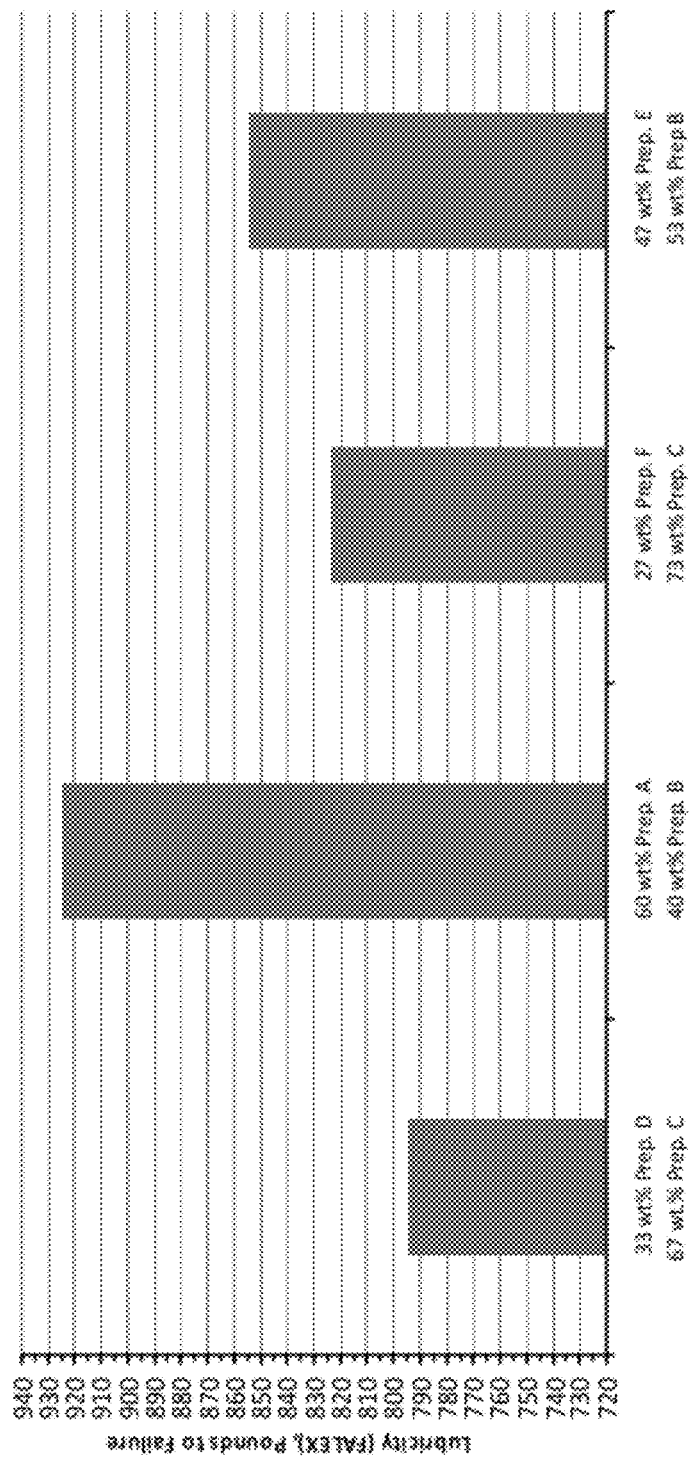
FIG. 3 is a graph of lubrication (or lubricity) of certain lubricant compositions as disclosed measured according to ASTM D2670.

It is well documented that lubricity is better with straight-chain rather than branched-chain esters. FIG. 3 compares the lubricity (FALEX test, determined according to ASTM D2670) of lubricant compositions prepared from branched versus partially branched esters. All of the lubricant compositions were formulated to have kinematic viscosities between 25 and 29 cSt. at 40° C. The measured lubricity for each lubricant composition is given in Table 6.

TABLE 6

Comparison of the Lubricity (FALEX, ASTM D2670) of Branched Versus Partially Branched Ethoxylated Glycerol and Triethylene Glycol Ester Blends. (All blends have kinematic viscosities between 25 and 29 cSt. at 40° C.)

| Ethoxylated glycerol ester, weight % Preparation | Triethylene glycol ester, weight % Preparation | Falex (Pounds to failure) | 40° C. Viscosity (cSt.) |
|---|---|---|---|
| 33 weight % Preparation D | 67 weight % Preparation C | 794 | 26 |
| 60 weight % Preparation A | 40 weight % Preparation B | 1085 | 29 |
| 27 weight % Preparation F | 73 weight % Preparation C | 824 | 24 |
| 47 weight % Preparation E | 53 weight % Preparation B | 854 | 24 |

Figure 4:
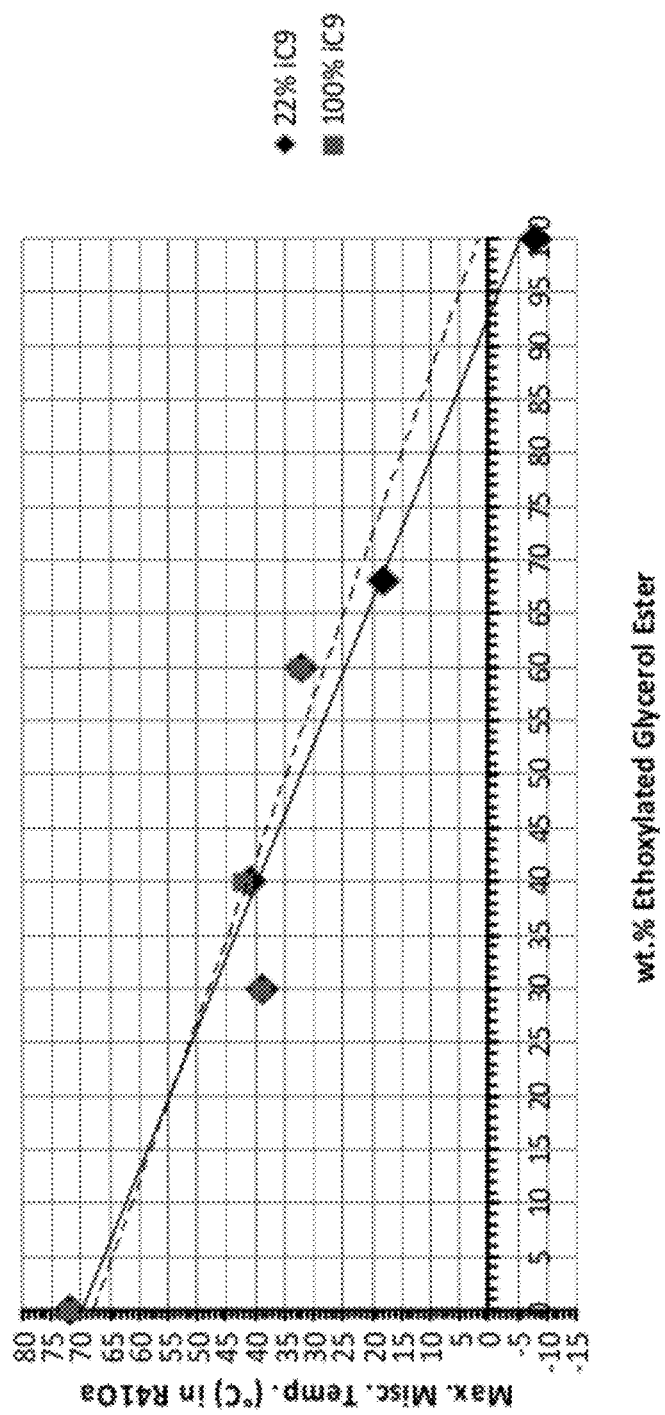

Despite following the expected viscosity and lubricity trends, the lubricants of the inventive technology now disclosed displayed unexpected degrees of miscibility with refrigerants. Literature provides that branching increases miscibility of ester lubricants in refrigerants. However, the lubricants of the inventive technology now disclosed were surprisingly unresponsive to branching, with the lubricants having relatively straight-chain esters performing as well as those having relatively branched esters. FIG. 4 shows the miscibility of the lubricant compositions in R410a where the lubricant compositions contained combinations of Preparations A and B as shown in Table 7 (graphed as curve 22% iC9). FIG. 4 also shows the miscibility of the lubricant compositions in R410a where the lubricant compositions contained combinations of Preparations D and C as shown in Table 8 (graphed as curve 100% iC9). FIG. 4 compares miscibility of R410a and lubricant compositions with highly branched esters of ethoxylated glycerol ($M_n$~1000) and triethylene glycol (curve 100% iC9) to miscibility of R410a and lubricant compositions with combinations of highly linear esters of ethoxylated glycerol ($M_n$~1000) and triethylene glycol (curve 22% iC9).

TABLE 7

Curve 22% Branched - Ethoxylated Glycerol ($M_n$ ~1000) Esterified with Mixed Acids (Preparation A) Blended with Triethylene Glycol Esterified with Mixed Acids (Preparation B)

| Preparation A (weight %) | Preparation B (weight %) | Maximum Temperature of Miscibility of R410a in Lubricant Composition, ° C. |
|---|---|---|
| 0 | 100 | 72 |
| 30 | 70 | 39 |
| 40 | 60 | 41 |
| 60 | 40 | 32 |
| 68 | 32 | 18 |
| 100 | 0 | −7.8 |

TABLE 8

Curve 100% Branched - Ethoxylated Glycerol ($M_n$ ~1000) Esterified with 3,3,5-Trimethylhexanoic Acid (Preparation D) Blended with Triethylene Glycol Esterified with 3,3,5-Trimethylhexanoic Acid (Preparation C)

| Preparation D (weight %) | Preparation C (weight %) | Maximum Temperature of Miscibility of R410a in Lubricant Composition, ° C. |
|---|---|---|
| 0 | 100 | 72 |
| 30 | 70 | 39 |
| 40 | 60 | 42 |
| 60 | 40 | 32 |

Figure 5:
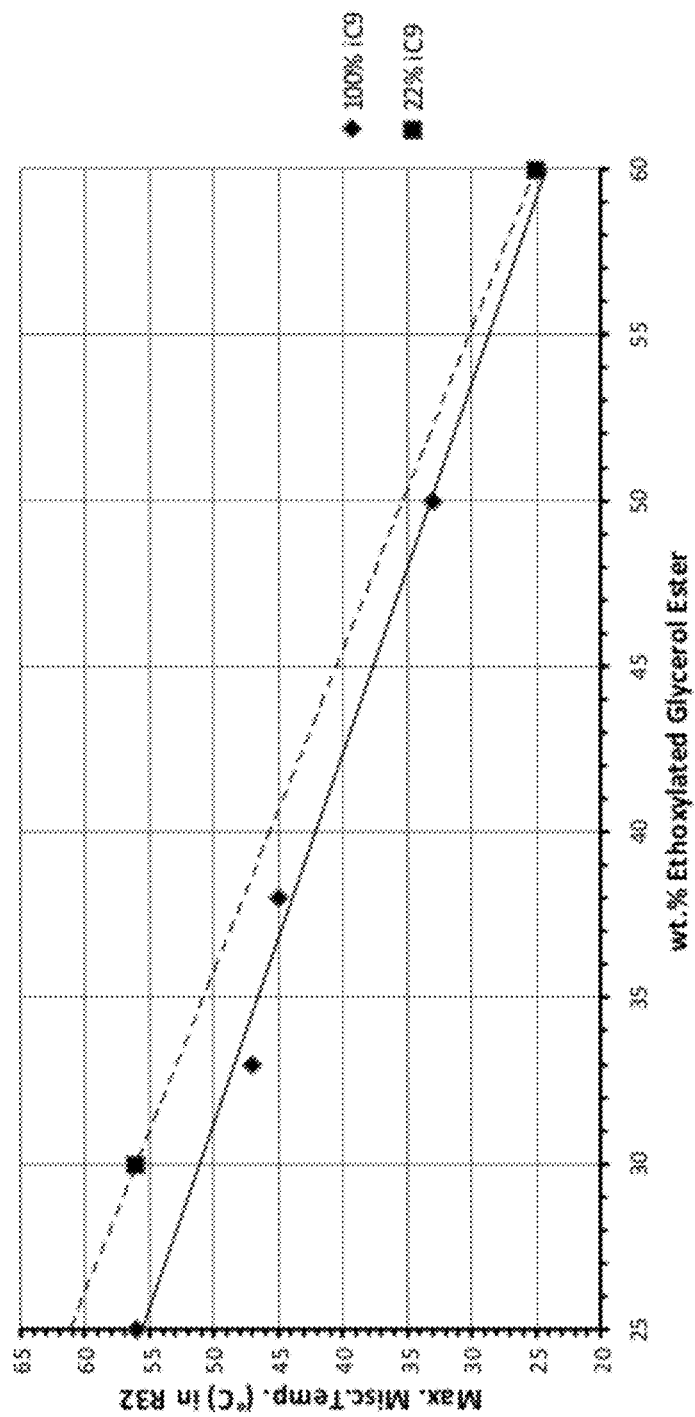
FIG. 5 is a graph of miscibility of certain lubricants compositions as disclosed in R32.

FIG. 5 similarly shows the miscibility of R32 with lubricant compositions containing combinations of Preparations A and B as shown in Table 9 (graphed as curve 22% iC9) and with lubricant compositions containing combinations of Preparations D and C as shown in Table 10 (graphed as curve 100% iC9). FIG. 5 compares miscibility of R32 with lubricant compositions with highly branched esters of ethoxylated glycerol ($M_n$~1000) and triethylene glycol (curve 100% iC9) to miscibility of R32 with lubricant compositions with combinations of highly linear esters of ethoxylated glycerol ($M_n$~1000) and triethylene glycol (curve 22% iC9).

TABLE 9

Curve 22iC9 - Ethoxylated Glycerol ($M_n$ ~1000) Esterified with mixed Acids (Preparation A) Blended with Triethylene Glycol Esterified with Mixed Acids (Preparation B)

| Preparation A (weight %) | Preparation B (weight %) | Maximum Temperature of Miscibility of R32 in Lubricant Composition, ° C. |
|---|---|---|
| 30 | 70 | 56 |
| 60 | 40 | 25 |

TABLE 10

Curve 100iC9 - Ethoxylated Glycerol ($M_n$ ~1000) Esterified with 3,3,5-Trimethylhexanoic Acid (Preparation D) Blended with Triethylene Glycol Esterified with 3,3,5-Trimethylhexanoic Acid (Preparation C)

| Preparation D (weight %) | Preparation C (weight %) | Maximum Temperature of Miscibility of R32 in Lubricant Composition, ° C. |
|---|---|---|
| 25 | 75 | 56 |
| 33 | 67 | 47 |
| 38 | 62 | 45 |
| 50 | 50 | 33 |

Thus, the lubricants of the inventive technology now disclosed unexpectedly provide a given miscibility in a refrigerant at a lower viscosity that would be expected from prior lubricant compositions. The fact that miscibility in refrigerants is by branching of the carboxylate group can be used to advantage in preparing the disclosed lubricant compositions with a desired viscosity and lubricity.

In all miscibility studies, the low temperature miscibility of the esters with the refrigerants was less than −40° C., which the lowest temperature tested. The minimum miscibility temperature was not reached in the test. Thus comparison of branched versus straight-chained lubricant compositions also showed the same unexpected insensitivity in miscibility at the low end temperature of the study.

Example 12

One-Pot Preparation of a Lubricant According to the Inventive Technology: Combination of 25 weight % Glycerol Ethoxylate Ester (Glycerol Ethoxylate $M_n$~1000) and 75 weight % Tetraethylene Glycol Ester of 3,3,5-Trimethylhexanoic Acid (No Solvent)

To a 2-liter reactor equipped with a mechanical stirrer, water trap, nitrogen source, thermocouple, and reflux condenser were added at once 176 grams of glycerol ethoxylate ($M_n$~1000), 307 grams of tetraethylene glycol, and 611 grams of 3,3,5-trimethylhexanoic acid. This addition was followed by an addition of 0.25 gram of tin(II)oxylate. The mixture was stirred under a nitrogen blanket and slowly heated to 230° C. The temperature was maintained at 230° C. for about 6.5 hours. During the heating period, the water of reaction was collected in the water trap and any carboxylic acid distilled was returned to the reactor. At the end of the reaction (as measured by the water collected), the excess carboxylic acid was distilled, collected, and not returned back to the reactor. The reaction mixture was allowed to cool to room temperature and was passed through a heated column of aluminum oxide, filtered, and purged with a stream of nitrogen. This resulted in 830 grams of combined esters.

The properties of the lubricant of Example 12 were determined as follows.

| | Example 12 |
|---|---|
| Kinematic Viscosity (cSt) at 40° C./100° C. | 25.5/5.82 |
| Viscosity Index | 183 |
| FALEX (0.1% BHT added) | 860 pounds to failure |
| Miscibility in R410a (° C.) (20 wt % lubricant loading) | 50° C. to −60° C.* |
| Miscibility in R32 (° C.) (20 wt % lubricant loading) | 51° C. to −60° C.* |

*Lower limit of test

This description of the inventive technology is merely exemplary in nature and, thus, variations that do not depart from the gist of the present disclosure are intended to be within the scope of the inventive technology. Such variations are not to be regarded as a departure from the spirit and scope of the inventive technology.

Specifically disclosed are embodiments of lubricant compositions comprising a mixture of about 1-99% by weight of the mixture of one or more ester compounds

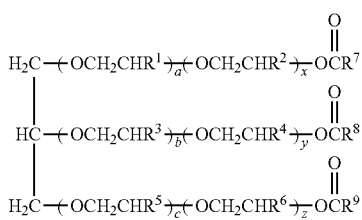

(I)

and about 1-99% by weight of the mixture of one or more second ester compounds

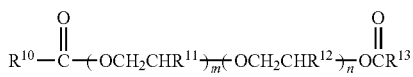

(II)

wherein $R^1$, $R^2$, $R^3$, $R^4$, $R^5$, $R^6$, $R^{11}$, and $R^{12}$ are each H or methyl; a+x, b+y, and c+z are integers from 1 to about 20, and m+n is an integer from 1 to about 10; and $R^7$, $R^8$, $R^9$, $R^{10}$ and $R^{13}$ are straight-chain and branched, substituted or unsubstituted alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, or cycloalkylarylalkyl groups having 1-17 carbons that optionally have any one or any combination of more than one of the following features: (1) each of a+x, b+y, and c+z is independently an integer of 1 to about 10; or m+n is an integer of about 2 to about 8; or each of a+x, b+y and c+z is independently an integer of 1 to about 10 and m+n is an integer of about 2 to about 8; (2) each of $R^1$, $R^2$, $R^3$, $R^4$, $R^5$, and $R^6$ is H; or each of $R^{11}$ and $R^{12}$ is H; or each of $R^1$, $R^2$, $R^3$, $R^4$, $R^5$, $R^6$, $R^{11}$, and $R^{12}$ is H; (3) each of $R^7$, $R^8$, $R^9$, $R^{10}$ and $R^{13}$ is independently selected from straight-chain and branched-chain alkyl and alkenyl groups and substituted and unsubstituted cycloalkyl groups that may optionally contain one or more heteroatoms selected from the group consisting of O, F, N, S, and Si or wherein each of $R^7$, $R^8$, $R^9$, $R^{10}$ and $R^{13}$ is independently selected from straight-chain alkyl and alkenyl groups that may optionally contain one or more heteroatoms selected from the group consisting of O, F, N, S, and Si; (4) each of $R^7$, $R^8$, $R^9$, $R^{10}$ and $R^{13}$ independently has about 3 to about 8 carbon atoms or one or both of $R^7$, $R^8$, and $R^9$ together have an average of about 5 to about 7 carbon atoms on a weight basis and $R^{10}$ and $R^{13}$ together have an average of about 5 to about 7 carbon atoms on a weight basis; (5) the mixture has about 20 to about 80% by weight of the one or more first ester compounds and about 80 to about 20% by weight of the one or more second ester compounds or the mixture has a major portion by weight of the one or more first ester compounds; (6) at least one of the first and second ester compounds is an ester of n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, and isononanoic acid, or combinations thereof or at least one of the first and second ester compounds is an ester of n-butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecelenic acid, lauric acid, stearic acid, isostearic acid, or combinations thereof; (7) the second ester compound or compounds (b) comprise a triethylene glycol diester; (8) the lubricant composition is free of lubricant compounds other than the mixture of first and second ester compounds or the lubricant composition includes a further lubricant or lubricants other than the first and second ester compounds of the mixture with the proviso that the total weight percent in the lubricant composition of the further lubricant or lubricants is less than the weight percent in the lubricant composition of the mixture consisting of the first and second ester compounds, which further lubricant or lubricants may be selected from the group consisting of polyol ester (POE) lubricants, poyalkylene glycol (PAG) lubricants, polyvinyl ether (PVE) lubricants, and combinations thereof; (9) the lubricant composition includes an additive or additives selected from the group consisting of antioxidants, anti-wear agents, extreme-pressure agents, oiliness agents, antifoaming agents, metal inactivating agents, viscosity index improvers, pour point depressants, detergent dispersants, stabilizers, metal passivators, corrosion inhibitors, flammability suppressants, acid scavengers, and combinations thereof, which may be from about 0.1 to about 5% by weight of the additive or additives; (10) the lubricant composition has a viscosity index of at least about 150, wherein these features include all values and endpoints of numerical ranges and combinations thereof and all materials and combinations of materials disclosed above that may be included in compositions mentioned for these features. As mentioned, all possible combinations of the enumerated optional features of these methods are specifically disclosed as embodiments. Also specifically disclosed are all lubricant and refrigerant combinations including this lubricant composition optionally with any one or any combination of more than one of the enumerated features (1)-(10), wherein each lubricant and refrigerant combination may optionally have any one or more of these features: (11) a minimum miscibility temperature of −40° C. or lower of the lubricant in the refrigerant; (12) wherein the refrigerant is selected from the group consisting of R410a, $R^{32}$, and HFO refrigerants or combinations of these refrigerants or combinations including these refrigerants; (13) wherein the refrigerant is greater than about 50% by weight of the lubricant and refrigerant combination or wherein the lubricant is from about 5 to about 20% by weight of the lubricant and refrigerant combination. Also specifically disclosed are all compression-type heat transfer devices comprising any one or these disclosed lubricant and refrigerant combinations, which may optionally be a positive displacement compressor or selected from stationary and mobile refrigeration and air conditioning equipment. Also disclosed is a method of lubricating a compression refrigeration equipment, comprising circulating any of the disclosed lubricant compositions.

Also specifically disclosed are embodiments of lubricant compositions comprising a mixture of about 1-99% by weight of the mixture of one or more ester compounds

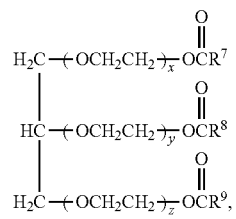

wherein x, y, and z are each independently an integer from 1 to about 20 and $R^7$, $R^8$, and $R^9$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms and that may be substituted or unsubstituted; and (b) about 1 to about 99% by weight of the mixture of one or more second ester compounds

wherein m is an integer of 1 to about 10 and $R^{10}$ and $R^{13}$ are each independently selected from the group consisting of straight-chain and branched alkyl, alkenyl, cycloalkyl, aryl, alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl groups having 1 to about 17 carbon atoms and that may be substituted or unsubstituted, wherein the first ester compound or compounds (a) and the second ester compound or compounds (b) together form at least about 50% by weight of the lubricant composition, which optionally have any one or any combination of more than one of the following features: (1) wherein x, y, and z are each independently an integer 1 to about 10, m is an integer 2 to about 8 and each of $R^7, R^8, R^9, R^{10}$, and $R^{13}$ independent has 3 to about 8 carbon atoms or wherein x, y, and z are each independently an integer 1 to about 10, m is an integer 2 to about 8, $R^7, R^8$, and $R^9$, together have an average of about 5 to about 7 carbon atoms on a weight basis, and $R^{10}$ and $R^{13}$ together have an average of about 5 to about 7 carbon atoms on a weight basis; (2) wherein each of $R^7, R^8, R^9, R^{10}$ and $R^{13}$ is independently selected from straight-chain and branched-chain alkyl and alkenyl groups and substituted and unsubstituted cycloalkyl groups that may optionally contain one or more heteroatoms selected from the group consisting of O, F, N, S, and Si or wherein each of $R^7, R^8, R^9, R^{10}$, and $R^{13}$ is independently selected from straight-chain alkyl and alkenyl groups that may optionally contain one or more heteroatoms selected from the group consisting of O, F, N, S, and Si; (3) each of $R^7, R^8, R^9, R^{10}$ and $R^{13}$ independently has about 3 to about 8 carbon atoms or one or both of $R^7, R^8$, and $R^9$ together have an average of about 5 to about 7 carbon atoms on a weight basis and $R^{10}$ and $R^{13}$ together have an average of about 5 to about 7 carbon atoms on a weight basis; (4) the mixture has about 20 to about 80% by weight of the one or more first ester compounds and about 80 to about 20% by weight of the one or more second ester compounds; (5) the mixture has a major portion by weight of the one or more first ester compounds; (6) at least one of the first and second ester compounds is an ester of n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, and isononanoic acid, or combinations thereof or at least one of the first and second ester compounds is an ester of n-butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecelenic acid, lauric acid, stearic acid, isostearic acid, or combinations thereof; (7) the second ester compound or compounds (b) comprise a triethylene glycol diester; (8) the lubricant composition is free of lubricant compounds other than the first and second ester compounds or the lubricant composition includes a further lubricant or lubricants other than the first and second ester compounds of the mixture with the proviso that the total weight percent in the lubricant composition of the further lubricant or lubricants is less than the weight percent in the lubricant composition of the mixture of the first and second ester compounds, which further lubricant or lubricants may be selected from the group consisting of polyol ester (POE) lubricants; poyalkylene glycol (PAG) lubricants, polyvinyl ether (PVE) lubricants, and combinations thereof; (9) the lubricant composition includes an additive or additives selected from the group consisting of antioxidants, anti-wear agents, extreme-pressure agents, oiliness agents, antifoaming agents, metal inactivating agents, viscosity index improvers, pour point depressants, detergent dispersants, stabilizers, metal passivators, corrosion inhibitors, flammability suppressants, acid scavengers, and combinations thereof, which may be about 0.1 to about 5% by weight of the additive or additives; (10) the lubricant composition has a viscosity index of at least about 150, wherein these features include all values and endpoints of numerical ranges and combinations thereof and all materials and combinations of materials disclosed above that may be included in compositions mentioned for these features. As mentioned, all possible combinations of the enumerated optional features of these methods are specifically disclosed as embodiments. Also specifically disclosed are all lubricant and refrigerant combinations including this lubricant composition optionally with any one or any combination of more than one of the enumerated features (1)-(10), wherein each lubricant and refrigerant combination may optionally have any one or more of these features: (11) a minimum miscibility temperature of −40° C. or lower of the lubricant in the refrigerant; (12) wherein the refrigerant is selected from the group consisting of R410a, R32, and HFO refrigerants or combinations of these refrigerants or combinations including these refrigerants; (13) wherein the refrigerant is greater than about 50% by weight of the lubricant and refrigerant combination or wherein the lubricant is about 5 to about 20% by weight of the lubricant and refrigerant combination. Also specifically disclosed are all compression-type heat transfer devices comprising any one or these disclosed lubricant and refrigerant combinations, which may optionally be a positive displacement compressor or selected from stationary and mobile refrigeration and air conditioning equipment. Also disclosed is a method of lubricating a compression refrigeration equipment, comprising circulating any of the disclosed lubricant compositions.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:
1. A lubricant and refrigerant combination, comprising:
a lubricant composition, comprising a mixture of:
(a) about 30 to about 70% by weight of the mixture of one or more first ester compounds having a structure

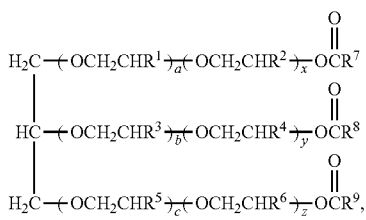

wherein each of $R^1$, $R^2$, $R^3$, $R^4$, $R^5$, and $R^6$ is independently H or methyl; each of a, b, c, x, y, and z is independently an integer and a+x, b+y, and c+z are each independently an integer 1 to about 20; and $R^7$, $R^8$, and $R^9$ are each independently selected from the group consisting of straight-chain and branched alkyl, and straight-chain and branched alkenyl groups having 3 to about 8 carbon atoms that may be substituted or unsubstituted; and (b) from about 30 to about 70% by weight of the mixture of one or more second ester compounds having a structure

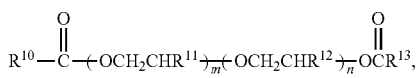

wherein each of $R^{11}$ and $R^{12}$ is independently H or methyl; each of m and n is independently an integer and m+n is an integer 1 to about 10; and $R^{10}$ and $R^{13}$ are each independently selected from the group consisting of straight-chain and branched alkyl, and straight-chain and branched alkenyl groups having 3 to about 8 carbon atoms that may be substituted or unsubstituted, wherein the lubricant composition is free of lubricant compounds other than the the first ester compound or compounds (a) and the second ester compound or compounds (b); and a refrigerant composition selected from the group consisting of R410a, R32, and HFO refrigerants, combinations of these refrigerants, and combinations or refrigerants comprising at least one of these refrigerants, wherein the lubricant and refrigerant combination has a minimum miscibility temperature of about −40° C. or lower.

2. A lubricant composition according to claim 1, wherein (a) each of a+x, b+y, and c+z is independently an integer 1 to about 10, or (b) m+n is an integer about 2 to about 8, or (c) each of a+x, b+y, and c+z is independently an integer 1 to about 10 and m+n is an integer about 2 to about 8.

3. A lubricant composition according to claim 1, wherein (a) each of $R^1$, $R^2$, $R^3$, $R^4$, $R^5$, and $R^6$ is H, or (b) each of $R^{11}$ and $R^{12}$ is H, or (c) each of $R^1$, $R^2$, $R^3$, $R^4$, $R^5$, $R^6$, $R^{11}$, and $R^{12}$ is H.

4. A lubricant and refrigerant combination, comprising:

a lubricant composition, comprising a mixture of:

(a) about 20 to about 80% by weight of the mixture of one or more first ester compounds having a structure

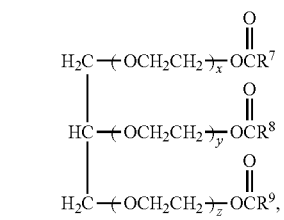

wherein x, y, and z are each independently an integer 2 to about 8 and $R^7$, $R^8$, and $R^9$ are each independently selected from the group consisting of straight-chain and branched alkyl and straight-chain and branched alkenyl groups having 3 to about 8 carbon atoms that may be substituted or unsubstituted; and (b) from about 20 to about 80% by weight of the mixture of one or more second ester compounds having a structure

wherein m is an integer 1 to about 10 and $R^{10}$ and $R^{13}$ are each independently selected from the group consisting of straight-chain and branched alkyl, and straight-chain and branched alkenyl groups having 3 to about 8 carbon atoms that may be substituted or unsubstituted, wherein the lubricant composition is free of lubricant compounds other than the first ester compound or compounds (a) and the second ester compound or compounds (b); and a refrigerant composition selected from the group consisting of R410a, R32, and HFO refrigerants, combinations of these refrigerants, and combinations or refrigerants comprising at least one of these refrigerants, wherein the lubricant and refrigerant combination has a minimum miscibility temperature of about −55° C. or lower.

5. A lubricant composition according to claim 1, wherein the composition meets one or both of the conditions (a-1) $R^7$, $R^8$, and $R^9$ together have an average of about 5 to about 7 carbon atoms and (a-2) $R^{10}$ and $R^{13}$ together have an average of about 5 to about 7 carbon atoms.

6. A lubricant composition according to claim 1, wherein the mixture consists of about 40 to about 60% by weight of the one or more first ester compounds (a) and about 40 to about 60% by weight of the one or more second ester compounds (b).

7. A lubricant composition according to claim 1, wherein a major portion by weight of the mixture is the one or more first ester compounds (a).

8. A lubricant according to claim 1, wherein at least one of the first and second ester compounds is an ester of n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, or combinations thereof.

9. A lubricant according to claim 1, wherein at least one of the first and second ester compounds is an ester of n-butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, or combinations thereof.

10. A lubricant according to claim 1, wherein the first ester compound or compounds (a) comprise a glycerol ethoxylate triester and the second ester compound or compounds (b) comprise at least one of a triethylene glycol diester and a tetraethylene glycol diester.

11. A lubricant composition according to claim 1, further including an additive or additives selected from the group consisting of antioxidants, anti-wear agents, extreme-pressure agents, oiliness agents, antifoaming agents, metal inactivating agents, viscosity index improvers, pour point depressants, detergent dispersants, stabilizers, metal passivators, corrosion inhibitors, flammability suppressants, acid scavengers, and combinations thereof.

12. A lubricant composition according to claim 11, comprising about 0.1 to about 5% by weight of the additive or additives.

13. A lubricant composition according to claim 11, wherein the additive is selected from the group consisting of diaryl sulfides, arylalkyl sulfides, dialkyl sulfides, diaryl disulfides, arylalkyl disulfides, dialkyl disulfides, diaryl polysulfides, arylalkyl polysulfides, dialkyl polysulfides, dithiocarbamates, derivatives of 2-mercaptobenzothiazole, derivatives of 2,5-dimercapto-1,3,4-thiadiazole, and combinations thereof.

14. A lubricant composition according to claim 11, wherein the additive is selected from the group consisting of 2,5-bis(n-octyldithio)-1,3,4-thiadiazole, dioctyl disulfide, and combinations thereof.

15. A lubricant and refrigerant combination according to claim 1, having a minimum miscibility temperature of about −55° C. or lower.

16. A compression-type heat transfer device comprising a lubricant and refrigerant combination composition according to claim 1.

17. A lubricant and refrigerant combination, comprising:
a lubricant composition comprising:
(a) about 20 to about 80% by weight of one or more first ester compounds comprising a glycerol ethoxylate ester formed by esterification with 3,3,5-trimethylhexanoic acid; and
(b) about 20 to about 80% by weight of one or more second ester compounds comprising a triethylene glycol ester formed by esterification with 3,3,5-trimethylhexanoic acid, a tetraethylene glycol ester formed by esterification with 3,3,5-trimethylhexanoic acid, or a combination of the triethylene glycol ester formed by esterification with 3,3,5-trimethylhexanoic acid and the tetraethylene glycol ester formed by esterification with 3,3,5-trimethylhexanoic acid, wherein the first ester compound or compounds (a) and the second ester compound or compounds (b) together form greater than or equal to about 50% by weight of the lubricant composition; and
a refrigerant composition selected from the group consisting of R410a, R32, and HFO refrigerants, combinations of these refrigerants, and combinations or refrigerants comprising at least one of these refrigerants, wherein the lubricant and refrigerant combination has a minimum miscibility temperature of about −55° C. or lower.

18. A lubricant and refrigerant combination according to claim 17, wherein the one or more second ester compounds comprises a tetraethylene glycol ester of 3,3,5-trimethylhexanoic acid.

* * * * *